US010632894B2

(12) United States Patent
Andre et al.

(10) Patent No.: US 10,632,894 B2
(45) Date of Patent: Apr. 28, 2020

(54) TWO-LEVEL PALLET FOR STACKABLE LOADING

(71) Applicant: LOHR INDUSTRIE, Hangenbieten (FR)

(72) Inventors: Jean-Luc Andre, Molsheim (FR); Pierre Leonhart, Illkirch (FR)

(73) Assignee: LOHR INDUSTRIE, Hangenbieten (FR)

( * ) Notice: Subject to any disclaimer, the term of this patent is extended or adjusted under 35 U.S.C. 154(b) by 127 days.

(21) Appl. No.: 16/064,573

(22) PCT Filed: Jan. 9, 2017

(86) PCT No.: PCT/FR2017/050042
§ 371 (c)(1),
(2) Date: Jun. 21, 2018

(87) PCT Pub. No.: WO2017/118829
PCT Pub. Date: Jul. 13, 2017

(65) Prior Publication Data
US 2018/0370412 A1    Dec. 27, 2018

(30) Foreign Application Priority Data
Jan. 7, 2016  (FR) .................................... 16 50103

(51) Int. Cl.
*B60P 3/08*    (2006.01)
*B65D 85/68*    (2006.01)
(Continued)

(52) U.S. Cl.
CPC .................................... *B60P 3/08* (2013.01);
*B60P 3/06* (2013.01); *B60P 3/07* (2013.01);
*B60P 3/073* (2013.01);
(Continued)

(58) Field of Classification Search
CPC .... B60P 3/08; B60P 3/06; B60P 3/077; B60P 3/075; B60P 3/073; B60P 3/07;
(Continued)

(56) References Cited

U.S. PATENT DOCUMENTS 1,263,788 A * 4/1918 Michod ................... B60P 3/073
410/25
1,280,512 A * 10/1918 Macomber .............. B60P 3/073
410/16
(Continued)

FOREIGN PATENT DOCUMENTS

CN        102120520 A     7/2011
JP        2014148310 A    8/2014
(Continued)

OTHER PUBLICATIONS

International Search Report issued in PCT Patent Application No. PCT/FR2017/050042 dated May 18, 2017.

*Primary Examiner* — Stephen T Gordon
(74) *Attorney, Agent, or Firm* — Marshall, Gerstein & Borun LLP

(57) ABSTRACT

The two stackable loading level pallet makes it possible to transport one or two stacked cars in a container or airplane pallet. Said pallet is non-motorized, capable of being folded flat, stackable, and capable of being opened out by a forklift truck. In a lower position, the top support structure of said pallet, which is framed and has a completely free central space, fits into the bottom support structure of said pallet, and the top and rear front wheel support devices of the top support structure are inserted onto or in alignment with the bottom wheel support assembly of the bottom support structure and thus form all or part of a lower rolling path that makes it possible to load a motor vehicle onto the top (Continued)

support structure of said pallet via the own movement thereof and without an access ramp.

19 Claims, 12 Drawing Sheets

(51) Int. Cl.
| | |
|---|---|
| *B60P 3/07* | (2006.01) |
| *B60P 3/073* | (2006.01) |
| *B65D 90/00* | (2006.01) |
| *B60P 3/075* | (2006.01) |
| *B60P 3/077* | (2006.01) |
| *B60P 3/06* | (2006.01) |
| *B65D 88/12* | (2006.01) |
| *B61D 3/18* | (2006.01) |
| *B61D 45/00* | (2006.01) |
| *B63B 25/00* | (2006.01) |

(52) U.S. Cl.
CPC ............ *B60P 3/075* (2013.01); *B60P 3/077* (2013.01); *B61D 3/18* (2013.01); *B61D 3/188* (2013.01); *B61D 45/007* (2013.01); *B63B 25/004* (2013.01); *B63B 25/008* (2013.01); *B65D 85/68* (2013.01); *B65D 88/129* (2013.01); *B65D 90/004* (2013.01); *B65D 90/0073* (2013.01); *B65D 2585/6867* (2013.01)

(58) Field of Classification Search
CPC ....... B63B 25/004; B63B 25/008; B61D 3/18; B61D 45/007; B61D 3/188; B65D 90/004; B65D 88/129; B65D 90/0073; B65D 85/68; B65D 2585/6867
USPC .................. 410/24, 25, 26, 27, 30, 4, 18
See application file for complete search history.

(56) References Cited

U.S. PATENT DOCUMENTS

| | | |
|---|---|---|
| 4,917,557 A | 4/1990 | Kato et al. |
| 5,213,458 A | 5/1993 | Preller et al. |
| 5,567,111 A | 10/1996 | Gearin et al. |
| 5,890,855 A | 4/1999 | Claps |
| 2005/0100422 A1* | 5/2005 | Clive-Smith ........ B65D 88/005 410/14 |
| 2007/0189872 A1 | 8/2007 | Omuta |

FOREIGN PATENT DOCUMENTS

| | | |
|---|---|---|
| WO | WO-99/18308 A1 | 4/1999 |
| WO | WO-2015/040912 A1 | 3/2015 |

* cited by examiner

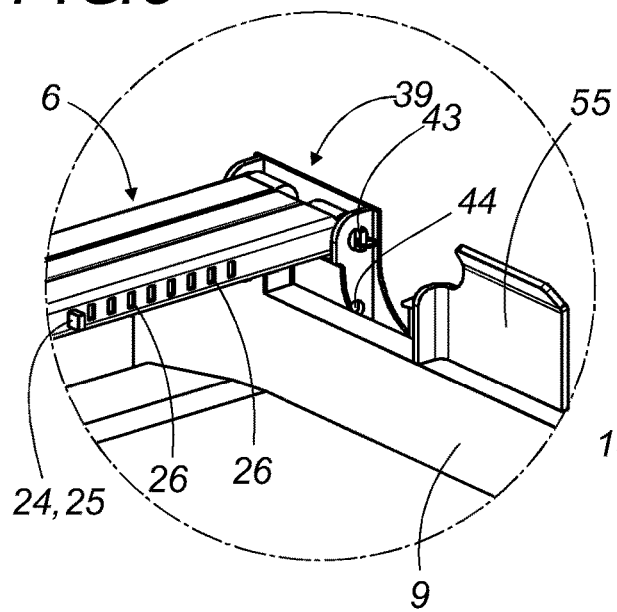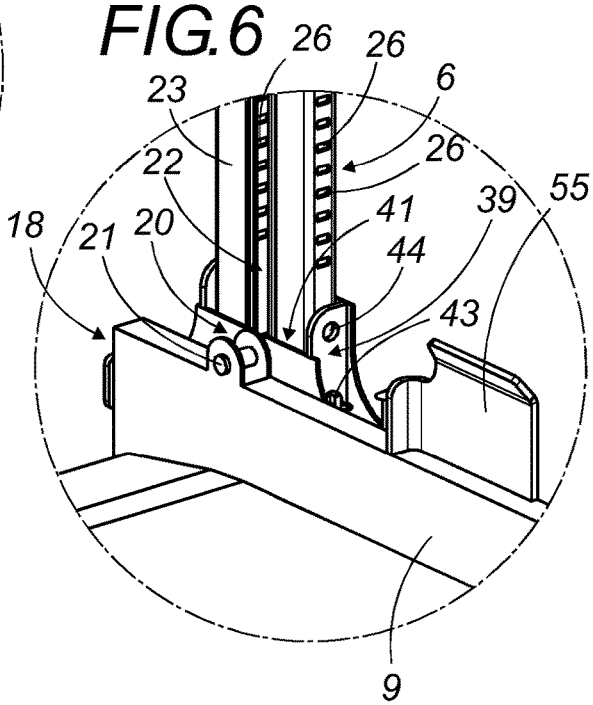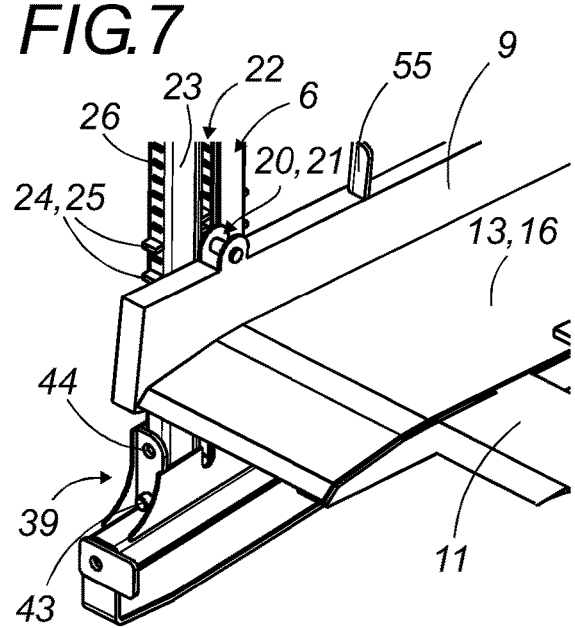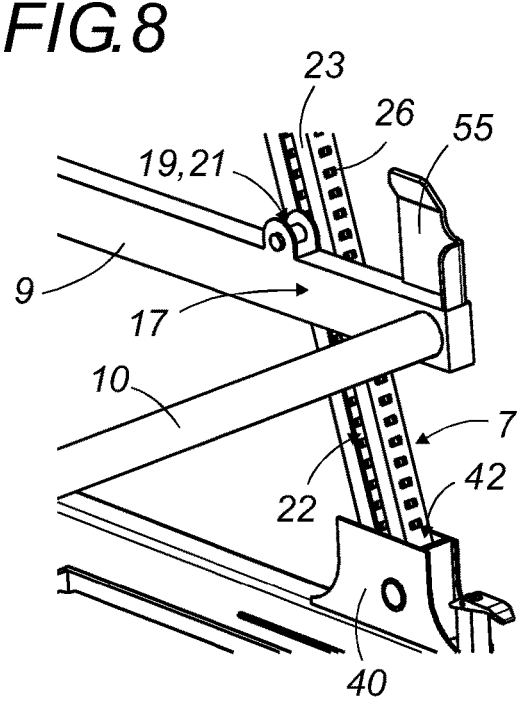

TWO-LEVEL PALLET FOR STACKABLE LOADING

TECHNICAL FIELD

The present disclosure pertains to the technical field of transporting motor vehicles in standardized transportation containers or pallets, particularly for transportation by sea, rail, road or air.

More particularly, it concerns a deployable pallet with two loading levels, the top loading structure whereof can be fitted into the bottom loading structure, in the folded configuration, for transportation of a single vehicle, or raised to an upper position with variable height and tilt to transport two automobile vehicles, optionally in either a transport container or an airplane pallet.

BACKGROUND

Today, transporting motor vehicles over long distances takes place very frequently, for instance between the place of manufacture and the place of sale, very often in two different countries or even on two different continents.

To ensure safe and economical transport, the use of standardized transport containers, also referred to as intermodal containers has become widely developed.

Such containers are indeed capable of transporting fragile goods such as motor vehicles economically over long distances while protecting them, in particular by sea or over land, whether on the road or on freight trains.

To be able to transport simultaneously the greatest possible number of vehicles and optimize the available space inside a standardized container, in a prior art, pallets were designed to fit out these containers and receive the motor vehicles to be transported.

Pallets like this, generally having two superimposed loading levels, thus offer the means of advantageously transporting safely four motor vehicles simultaneously instead of two, in a standardized 12 meter (40 foot) long container.

These pallets also make it easier to load the vehicles. Because the width of the standardized containers is only slightly greater than that of the motor vehicles to be transported, it is relatively tricky to load and unload the motor vehicles directly in the container without running the risk of damaging them.

Using these pallets, it is advantageously possible to load the vehicles onto the pallet while they are still outside the container. Then, when the motor vehicles are solidly fastened to the pallet, they can be loaded into the container using a handling machine, such as a forklift truck.

Generally, these pallets are designed to fold, by lowering the upper loading deck to take the least amount of space, when they are not in use, for instance during storage or when they are transported empty. Lowering the upper loading deck in this way also makes it easier to load the motor vehicle to be transported on it since the loading deck is only lifted to the raised transport position in a second stage.

Examples of such collapsible pallets with two loading decks are described, for instance, in the following prior documents: U.S. Pat. Nos. 5,567,111, 4,917,557, 5,213,458, WO 2015/040912 and WO 99/18308.

This disclosure also refers to a collapsible double-decker pallet intended for a similar application. However, the pallet according to the described embodiments consists of different means endowing it with many advantages over the pallets disclosed by the prior art.

The air freight transportation of motor vehicles in cargo planes has also grown. Because the dimensional constraints imposed by this particular means of transportation are different, the aforesaid standard containers used for transportation by sea, rail or road cannot be used for air transport, and specific airplane containers or airplane pallets had to be developed for this application.

The folding pallets in prior art were developed to be compatible with standard land or sea transport containers and cannot be used on said airplane pallets because once they are deployed and loaded, their shape and size are not suitable.

Due to the adjustable and adaptable configuration thereof, the pallet according to the described embodiments can optionally be used in a standard land or sea transport container, or on an airplane pallet. This change in configuration is advantageously done by a simple adjustment to the height of the top loading structure and the positioning of the vehicles transported, which is quick and easy.

The pallet according to the described embodiments is thus highly flexible in use and can advantageously be adjusted according to the different models and dimensions of the vehicles transported and to the different constraints of the used means of transportation, however the operator wishes.

SUMMARY OF THE DISCLOSURE

The disclosed embodiments provide a deployable, stackable, non-motorised pallet with a double-deck loading arrangement designed for loading one or two motor vehicles for their transport in a transport container, for instance a standardised container.

This pallet can also be loaded on a standard air cargo pallet for air transport.

This pallet comprises:
  a bottom support structure and a top support structure, each capable of supporting a motor vehicle, the top support structure being provided in order to alternately move from a lower position to an upper position wherein it is maintained, raised above the bottom support structure;
  two main posts and two secondary posts, which are attached at the lower ends thereof, respectively, at the rear, for the main posts, and at the front, for the secondary posts, of the bottom support structure, which are alternatively to be found in a lying position or an erected position, and which carry the top support structure in the upper position;
  front sliding members and rear sliding members, allowing for the sliding of the top support structure along the main posts and secondary posts in order to pass from a lower position thereof to an upper position thereof and vice versa.

According to the disclosed embodiments, the top support structure is a framework structure that is substantially flat and that delimits a completely free central space and that comprises a top front wheel support device and a top rear wheel support device, that are discontinuous one from the other and intended to receive the wheels of a motor vehicle in a transportation position upon the top support structure.

The bottom support structure is a substantially flat structure comprising a bottom wheel support assembly intended to receive the wheels of a motor vehicle in a transportation position upon the bottom support structure.

In a lower position, the top support structure is nested within the bottom support structure, top front and top rear wheel support devices being inserted onto or in alignment with the bottom wheel support assembly of the bottom support structure and thus forming, together with said bottom wheel support assembly, all or part of a lower rolling path which allows for the loading onto the top support structure of a motor vehicle up to a transportation position, via the own movement thereof and without an access ramp.

According to a preferred embodiment, the bottom support structure is a partially open frame comprising, besides the bottom wheel support assembly:
- two outer longitudinal members and two inner longitudinal members; and
- a set of cross-members wherein at least one front end cross-member and one rear end cross-member that join said outer longitudinal members and said inner longitudinal members.

According to a preferred embodiment, the pallet also comprises retaining means that block the front sliding members and rear sliding members, when the upper position of the top support structure is reached, these retaining means being capable of blocking the front sliding members and rear sliding members, at different heights along the main posts and secondary posts respectively, in order to adjust the altitude of the upper position of the top support structure.

According to an embodiment, in the lying position, the main posts extend transversely with respect to the general direction of the pallet.

According to an embodiment, in the erected position, the main posts are inclined laterally outward or else are substantially vertical.

According to an embodiment, the secondary posts are articulately secured by the lower end thereof to the front of the bottom support structure, and can pass by pivoting from the lying position to the erected position.

According to an embodiment, in the erected position, the secondary posts are inclined towards the rear of the pallet.

However, other variants can be considered, in particular a pallet having the main posts in a longitudinally lying position and/or with secondary posts in a substantially vertical or forward-inclined erected position. Similarly, a hinged version of the main posts can also be considered, using a pivoting movement to move them from the lying position to the erected position.

According to a preferred embodiment, the secondary posts are attached to the top support structure in such a way as to automatically erect when the front of the top support structure is raised, the inclination thereof in the erected position depending upon the height to which the front of the top support structure is raised.

Depending on the embodiments, the bottom wheel support assembly may be a set of four individual structures each intended to receive one of the wheels of the transported motor vehicle, or a set of two transverse structures intended to receive for one the two front wheels and for the other the two rear wheels of the transported motor vehicle, or a set of two longitudinal structures intended to receive for one the two left wheels and for the other the two right wheels of the transported motor vehicle, or also a single structure, for example a perimeter or solid, intended to receive all of the four wheels of the vehicle to be transported.

According to a preferred embodiment, the bottom wheel support assembly also comprises removable or folding or retractable extensions, which, in the folded out position, constitute an extension to the lower rolling path.

Depending on the embodiments, the top front wheel support device or the top rear wheel support device may be a set of two individual structures each intended to receive one of the two front or rear wheels of the transported motor vehicle, or a transverse structure intended to receive the two front wheels or the two rear wheels of the transported motor vehicle.

According to an embodiment, the top front wheel support device or the top rear wheel support device is movable longitudinally with respect to the general direction of the pallet.

According to a preferred embodiment, the pallet comprises receiving means capable of co-operating with the forks of a forklift truck, which are located at the front and the rear of the top support structure, and on the sides of the bottom support structure. It can be for example openings, contact places beneath tubes or beams, pockets, tunnels, sheaths, cavities, rings or preferentially articulated, folding or retractable handles.

Depending on the embodiments, the bottom support structure can comprise, on the underside thereof, rolls, rollers, sliding parts, ski-shaped longitudinal members, stands, or deployable roll or roller feet beneath the bottom support structure.

Depending on the embodiments, the pallet also comprises one or more longitudinal abutment elements, e.g. telescopic and/or of adjustable length.

It may also comprise an anchor member, particularly one or more additional intermediate posts, e.g. telescopic, or a means for passing or attaching a cable or a strap for fastening the pallet to the container or airplane pallet, located on the top support structure, on the sliding members, or on the main posts and secondary posts, or on one or more additional intermediate posts.

According to a preferred embodiment, when the pallet is fully collapsed, the pallet can be stacked upon other identical pallets and in that it comprises protruding centering elements allowing for the automatic centering of an identical stacked pallet thereabove.

The disclosed embodiments also provide a method for loading one or two motor vehicles inside a container or onto an airplane pallet by means of a pallet.

This method comprises the following steps:
- placing the pallet on the ground, the top support structure being nested into the bottom support structure;
- loading a vehicle onto the top support structure in making it roll over the lower rolling path until the wheels thereof are arranged on the top front wheel support device and the top rear wheel support device of the top support structure;
- immobilizing the wheels of said vehicle on the corresponding front and rear top wheel support devices;
- pushing the loaded pallet using a forklift truck until it is inside the container or onto the airplane pallet.

This method can also comprise the following step:
- placing the two main posts in the erected position;
- this step being performed before or after loading the vehicle onto the top support structure.

Before the step consisting of pushing the loaded pallet using a forklift truck until it is inside the container or onto the airplane pallet, this method can also comprise the following steps:
- raising the rear of the top support structure using the forks of a forklift truck, by sliding the rear sliding members along the main posts;
- locking the rear of the top support structure in the upper position;
- raising the front of the top support structure using the forks of a forklift truck, by sliding the front sliding members along the secondary posts thus causing the pivoting of said articulated secondary posts that automatically erect during the raising of the front of the top support structure and pass from a lying position to an erected position;

locking the front of the top support structure in the upper position;

loading a second vehicle onto the bottom support structure, in making it roll over the bottom support structure until the wheels thereof are arranged on the bottom wheel support assembly;

immobilizing the wheels of the second vehicle on the bottom wheel support assembly.

The deployable pallet comprises many differences and offers many advantages over the pallets described in the prior art.

In particular, it is modular and adaptable because the same pallet can be used according to the needs: in a flat collapsed configuration for storage, stacking and retrieval, in a flat collapsed or partially extended configuration when it is necessary to load and transport only one vehicle on the pallet, and in a fully deployed configuration when two motor vehicles have to be loaded and transported simultaneously on the same pallet.

Furthermore, with a simple adjustment, the pallet can be configured such that it can be loaded into a standard container or onto an airplane pallet.

Advantageously, the pallet makes it possible to load one or two vehicles, based on the requirements, the means of transport anticipated, and the size of the motor vehicles to be transported. Accordingly, when heavy or tall vehicles have to be transported, in particular 4×4 or SUV vehicles, one vehicle only can be loaded per pallet, on a single loading level. In this case, the vehicle is loaded onto the top support structure which is left in the low position.

In addition, to facilitate the loading of large motor vehicles like this, the main posts can in some embodiments be removed entirely from the pallet to leave the passage entirely free, then put back easily and locked in a substantially vertical erected position after loading.

Alternatively, in other embodiments these main posts can advantageously be put in an erected position inclined sideways towards the outside of the pallet. The available width for loading a vehicle onto the top support structure is therefore made wider and large vehicles can be loaded without needing to fold back their wing mirrors.

When two vehicles are to be loaded, both loading levels are used. The pallet advantageously allows the two vehicles to be loaded flat onto the two support structures of the pallet, without necessitating a rigging or a ramp in order to access the top support structure. Indeed, when lowered, the top support structure nests into the bottom support structure and therefore constitutes little or no additional thickness. Then, a standard motor vehicle, even one low to the ground, can directly cross it without means of an access ramp and roll via the own movement thereof into transport position.

This rolling is moreover facilitated by the fact that, when nesting, the front and rear top wheel support devices are inserted onto or aligned with the bottom wheel support assembly of the bottom support structure, the assembly thus forming a lower rolling path for the vehicle that is either continuous or partial.

Furthermore, because the two support structures are advantageously nested, the folded pallet remains at a very low height even at its lateral edges. Consequently, the side doors of the motor vehicles transported can be opened unimpeded. Once the vehicle is loaded onto the pallet, the driver can open the door and exit unimpeded and without risking damage.

The top support structure is advantageously designed in framework form, i.e., a perimeter structure with an open center space as large as possible. Such a configuration makes it possible to tightly engage the two vehicles superimposed on the two loading levels, thereby considerably diminishing the necessary gaps. The overall height of the pallet loaded with two vehicles is thereby reduced.

Furthermore, said framework configuration facilitates nesting the two support structures, one inside the other, when the pallet is folded.

In addition, the pallets stack fully on one another in the collapsed configuration so that a large number can be stored in a limited space, for instance, to stack a large number in the same container for returning them to their point of departure once the motor vehicles have been transported, thus limiting the return journey expenses.

Furthermore, the pallet has main posts preferably folding transversely with respect to the general axis of the pallet.

The main posts are wide and are thus fully capable of withstanding and taking up all the longitudinal forces of the loaded pallet, in particular the braking forces generated during transport.

This pallet configuration is novel and advantageous, offering the means of dispensing with the lateral reinforcing drag braces often used in the prior art.

However, thanks to their transverse lying position, with the pallet in the collapsed configuration, these main posts only form a very small extra thickness, despite their considerable width, and do not obstruct the secondary posts which lie prone and in a longitudinal position.

In the collapsed configuration, the pallet is therefore almost flat and relatively low, while having sufficiently wide and solid posts to be able to take up satisfactorily all the forces liable to apply to the loaded pallet in the partially or entirely extended configuration during its transport.

In addition, the pallet advantageously allows the height of the top support structure to be adjusted. The height of the latter can be adjusted easily to suit the transported motor vehicle models and their respective dimensions. It can also be adjusted to the size of the container into which the pallet must be loaded.

The operator can also quickly and easily adjust the loaded pallet configuration based on the mode of transportation used, to accommodate the specific shape and dimensions required by a transport, be it inside a container or on an airplane pallet, the pallet thus being universal.

All pallet maintenance and adjustment operations, whether for its extension or collapsing, loading or unloading in the container, or yet again stacking or moving, are performed with a simple handling machine such as a forklift truck.

A machine like this is particularly widely used in all the possible zones where this type of pallet is employed, especially in airport, port, railway or road zones dedicated to the transport of goods, or in motor vehicle production, storage or sales zones. This avoids the need for costly specific infrastructures and loading equipment.

BRIEF DESCRIPTION OF THE FIGURES

Other characteristics and advantages will be revealed by reading the detailed description that follows, referring to the attached illustrations, in which:

FIGS. 5 to 7 are enlargements of details illustrating attachment of a main post to the bottom support structure and sliding of the rear sliding member along said main post;

FIG. 8 is an enlargement of a detail illustrating the articulated attachment of a secondary post to the bottom support structure and the sliding of the front sliding member along said secondary post;

DETAILED DESCRIPTION

Figure 1:
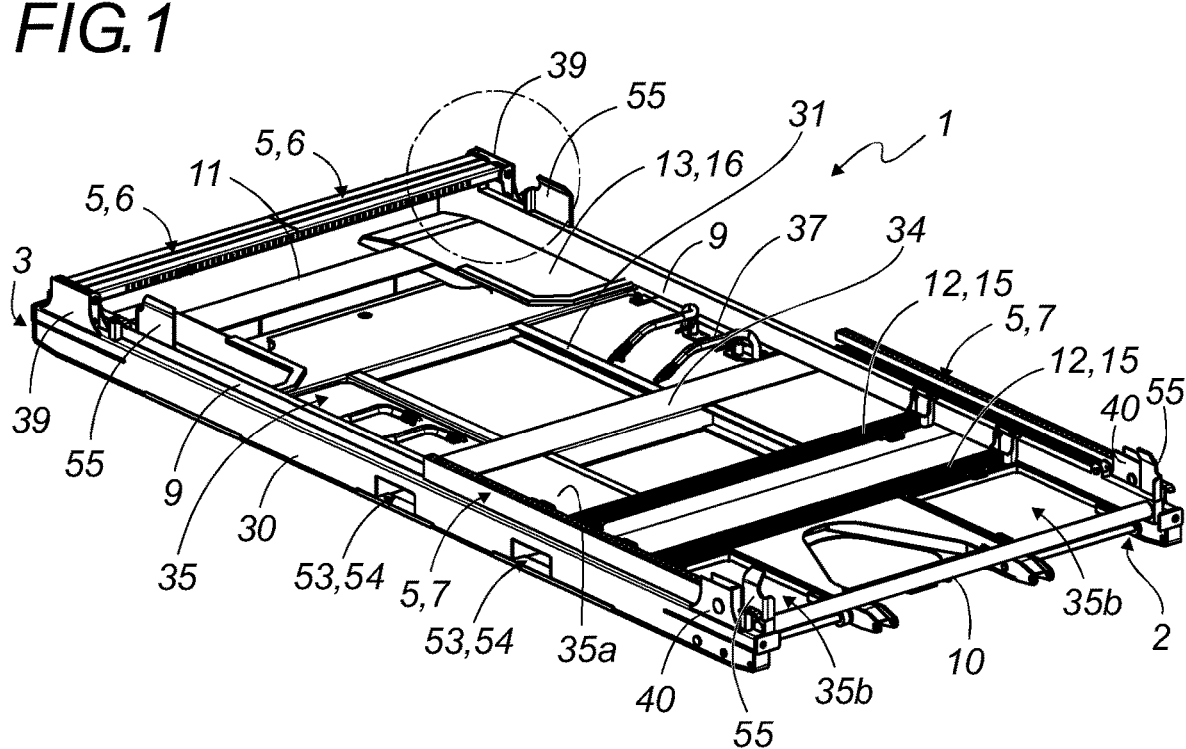
FIGS. 1 to 4 are perspective views of a first example of a pallet, respectively, from above in the folded configuration, then partially unfolded, then completely unfolded, and from below.

Examples of the pallet are now described in detail with reference to the FIGS. 1 to 38. The equivalent components shown in the various figures will bear the same numerical references.

It is understood that in this patent application, the front and the rear apply to the direction of vehicle loading in the various figures, with the vehicle on the top support structure of the pallet, so that the front end is the end where the secondary posts are located and the rear end is the one where the main posts of the pallet are located. Naturally, when the pallet is being used, this motor vehicle can be loaded in the opposite direction if desired.

Similarly, the concepts of longitudinal and transversal will be defined with respect to the general direction (main direction) of the pallet.

Finally, the nesting of one piece in another will be defined as being the complete or at least partial engagement of said piece in another, such that the total height of two nested pieces is less than the sum of the heights of each of said pieces taken in isolation. Thus, when the top support structure 2 is nested in the bottom support structure 3, it is not simply placed flat upon it but at least partially penetrates it, the overall thickness of the resulting structure being less than the sum of the thicknesses of the individual support structures, top 2 and bottom 3 taken in isolation.

In the various figures, several examples of the pallet 1 are shown.

This pallet 1 includes a top support structure 2 and a bottom support structure 3 forming the two superimposed loading levels for motor vehicles 4. These two support structure 2, 3 are connected to one another by a set of four posts 5, including two main posts 6 at the rear and two secondary posts 7 at the front of pallet 1. These posts 5 are located near the four outer corners of the pallet 1, to provide good stability without obstructing the opening of the transported motor vehicle doors.

In order to facilitate the imbrication of the vehicles 4 transported, one above the other, the top support structure 2 is made in the form of a framework, i.e., a perimeter structure, enclosing an empty central space 8, made as large as possible.

This top support structure 2 thus comprises two longitudinal beams 9 connected within the end zone thereof by means of a front end cross-member 10 and a rear end cross-member 11. The top support structure 2 furthermore comprises an top front wheel support device 12 and a top rear wheel support device 13, which are attached at a minimum onto the longitudinal beams 9 and possibly also onto the cross-members, rear 11 and/or front 10, and that are each intended to receive and support the wheels 14 of one of the wheel sets, respectively, front and rear, of the vehicle 4 loaded onto the top support structure 2.

Said two top wheel support devices, front 12 and rear 13, are discontinuous, i.e., independent one from the other, in order not to clutter the central space 8.

According to the variants, each of said top front wheel support devices, front or rear, can be a set of two individual structures that are intended to only receive one wheel 14, front or rear, of the transported vehicle 4, or a dual structure intended to receive the two front wheels 14, or the two rear wheels 14 of the transported vehicle 4. In this second specific case, it is a transversal structure.

According to the embodiments, these devices can take many forms.

Figure 3:
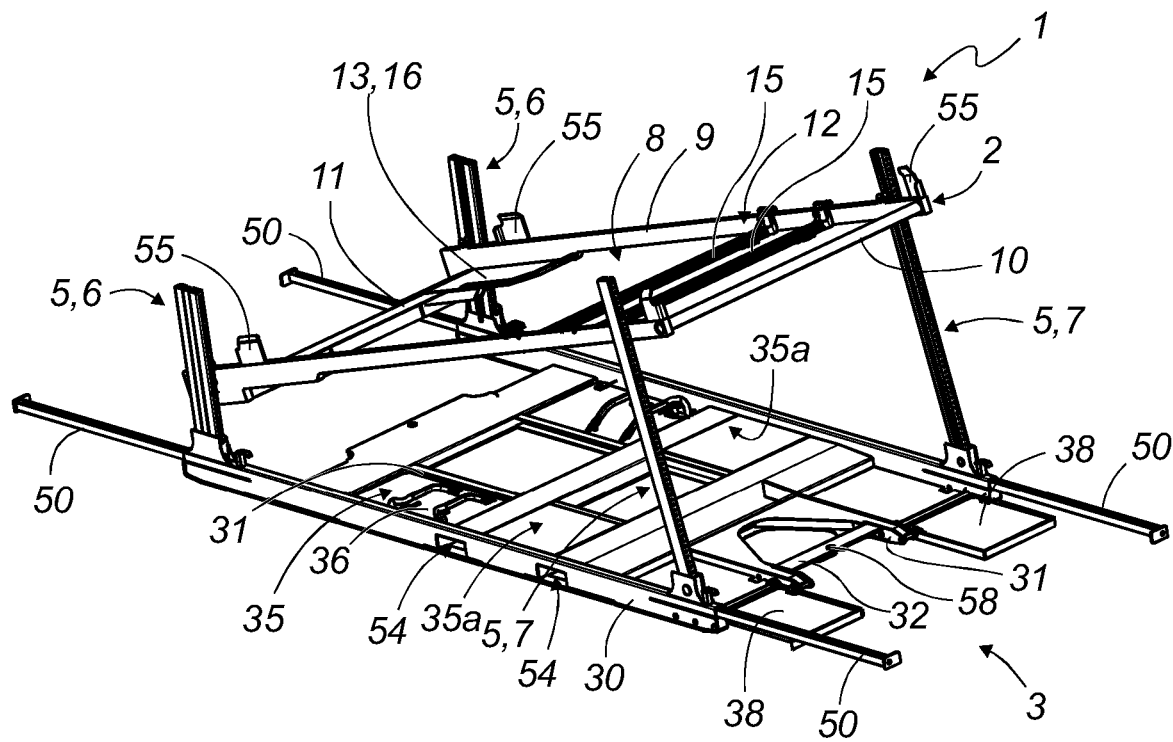
Figure 4:
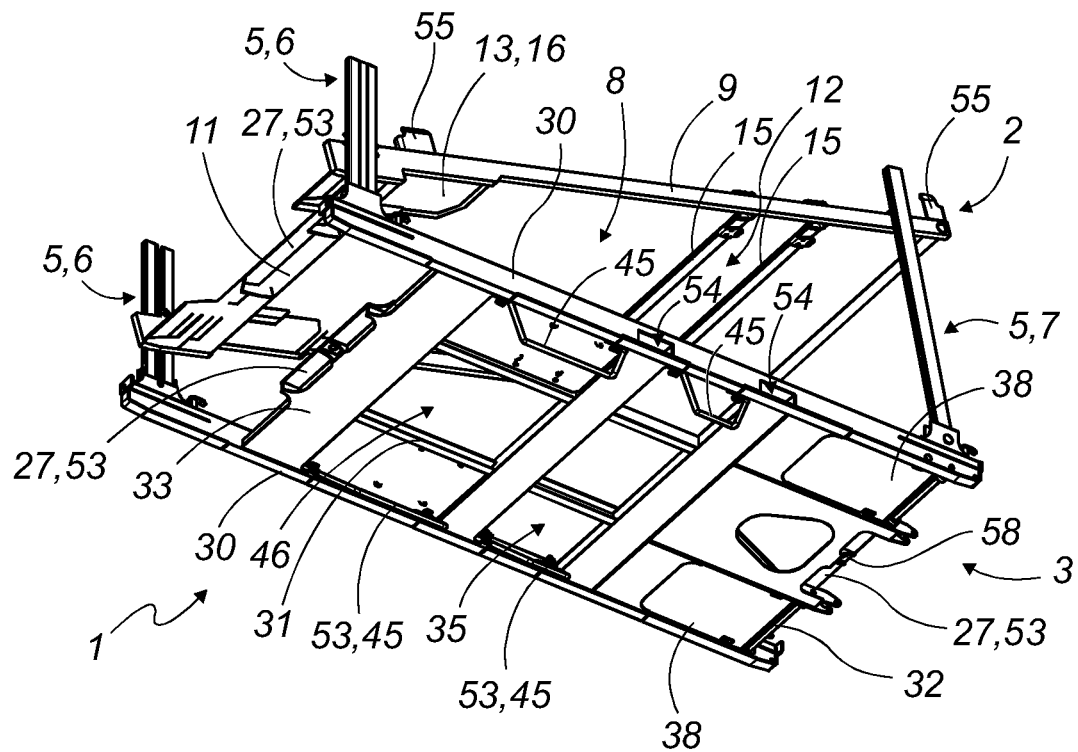
Figure 11:
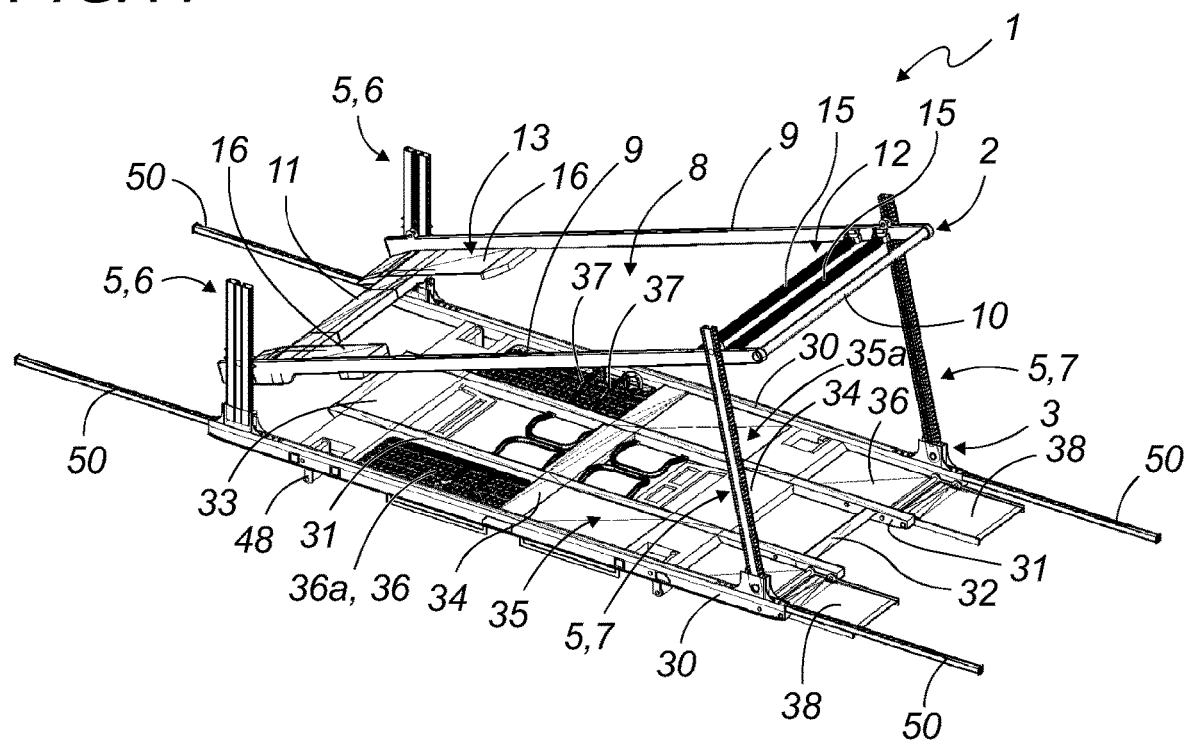
FIGS. 11 to 12 are perspective views of a second example of the pallet, from above and below respectively, when completely unfolded.

It can, for example, as with the variants of FIGS. 3 and 11, be two transversal tubes 15, preferably substantially cylindrical, which delineate between them a niche wherein the wheels 14 concerned, of the transported vehicle 4, sink slightly. The blocking of the car is thus implemented. Furthermore, when the car 4 is loaded onto the top support structure 2 in the upper position, the front of the car is lowered slightly, this makes it possible to reduce the total height of the pallet in the loaded state by a few centimeters.

Figure 14:
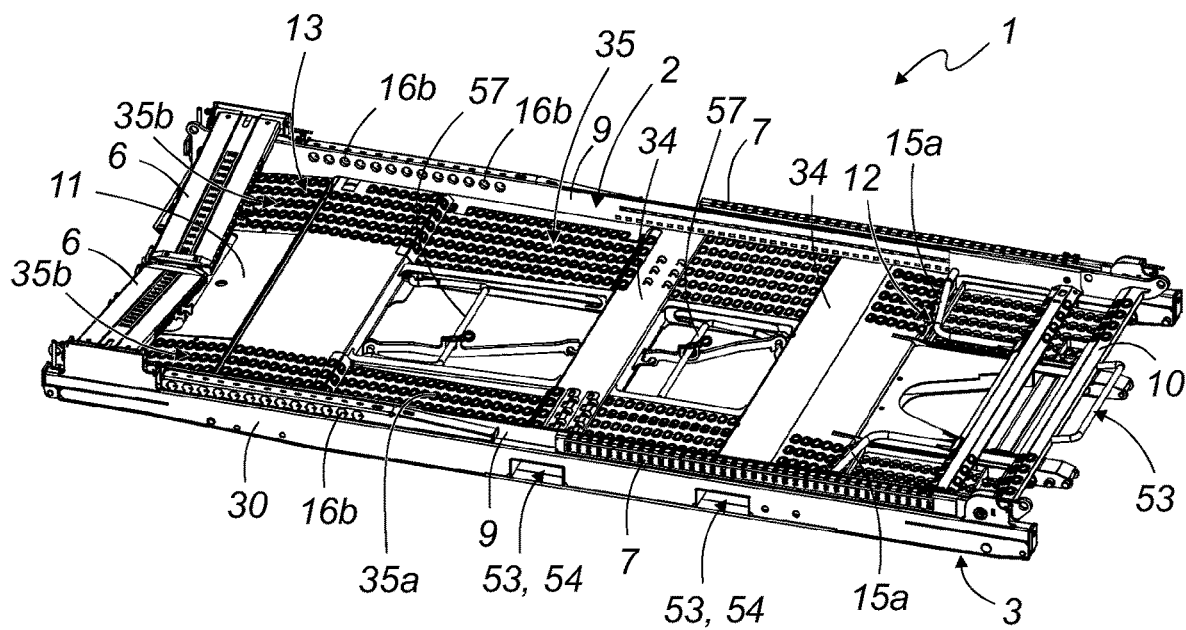
FIGS. 14 to 16 are perspective views of a third example of the pallet, from above in the folded configuration, and from below in the completely unfolded configuration, respectively.
Figure 15:
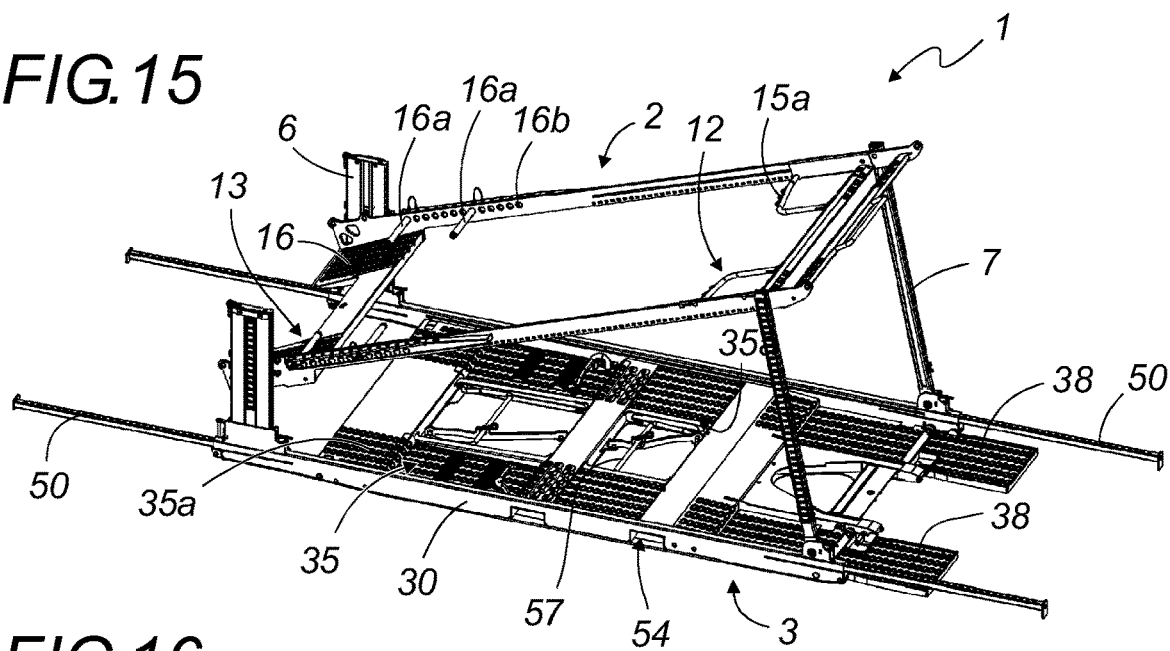
Figure 16:
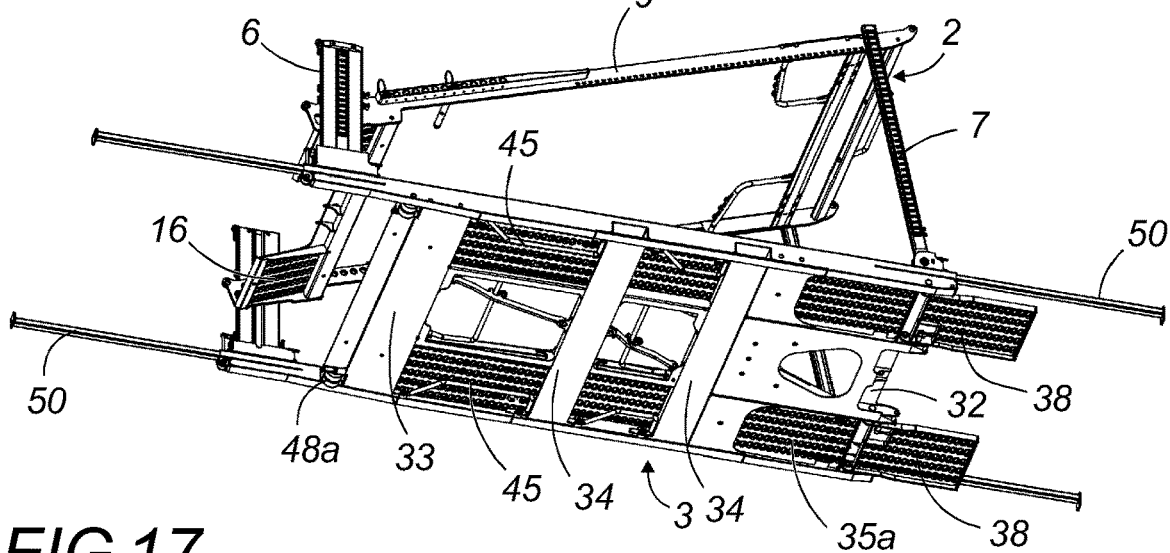

Alternatively, it can for example be a tube curved 15a in such a way as to delimit a receiving niche as illustrated in FIGS. 14 to 16, or else a decking.

The top rear wheel support device 13 preferably comprises at least one decking 16 attached to the rear end cross-member 11 and/or to the longitudinal beams 9, for example a single decking extending over the whole width of the top support structure 2, or two individual deckings, that are for example substantially rectangular.

As represented in FIGS. 15 and 16, the decking 16 can be supplemented or else replaced by two rods 16a mounted in holes 16b of the longitudinal beams 9 and extending cantilevered toward the inside of the frame. Said rods 16a also define therebetween a receiving niche for the wheels 14 of the vehicle.

Advantageously, if several holes 16b are provided as represented, the rods 16a can be moved in order to adapt themselves to different wheel 14 diameters or else to the different spacings between the wheel sets that can be matched according to the models of the vehicles 4.

Similarly, the top front wheel support device 12 can be provided movable by longitudinal translation, i.e., by sliding along the two longitudinal beams 9 in order to be able to adjust the relative positions thereof with respect to the top rear wheel support device 13. And the distance between the two transverse tubes 15 can be adjusted in order to suit the different possible diameters of the wheels 4. Once said adjustment is performed, the top wheel support devices are locked to the longitudinal beams 9.

Although not represented in the figures, wheel chocks or straps that are suitable for ensuring the fixing of the wheels 14 of the transported vehicle 4 can advantageously be provided for near the top wheel support devices, front 12 and rear 13. These chocks or straps can be removable or directly integrated into these devices or any other area of the top support structure 2 where they would be accessible by the operator and not inconvenient.

Near the corners of the top support structure 2, i.e., within the front end area 17 and the rear end area 18 of the longitudinal beams 9, the top support structure 2 furthermore comprises protruding sliding members, respectively, two front sliding members 19 and two rear sliding members 20, that extend transversely to the longitudinal beams 9 and that extend towards the outside of the top support structure 2. Said sliding members, front 19 and rear 20, which are more visible in the enlargements of FIGS. 6 to 8, are, for example, substantially cylindrical rods 21.

As will be seen in the following, these rear 20 and front 19 sliding members slide respectively along the main posts 6 and secondary posts 7 when the top support structure 2 moves from the low position to the high position and inversely.

In the embodiments shown, the main posts 6 and secondary posts 7 each include, for this purpose, a groove 22 opening out on their interior face 23 and running down their entire length. The sizes of these grooves 22 are adapted so that the rods 21 can be engaged in them and slide freely inside them. Preferably, these rods 21 are extended by a shoulder in groove 22 inside the corresponding post, preventing the escaping of rod 21 from the groove 22 during this sliding movement.

Pallet 1 also includes retaining means 24 locking the front 19 and rear 20 sliding members when they reach a certain height on secondary posts 7 and main posts 6 respectively.

The retaining means 24 shown are pins 25 working with a set of complementary receiving holes 26, arranged in the main posts 6 and the secondary posts 7.

Two pins 25 are engaged transversely to groove 22 through the receiving holes 26, one above and the other below each of the rods 21, when they reach the high position. In this way, the rods 21 are blocked and locked in the high position in both directions, that is, both upwards and downwards.

In the preferential variants shown, there are a multitude of receiving holes 26 over the entire length of the main posts 6 and secondary posts 7. In this way, the front 19 and rear 20 sliding members can be blocked at different heights along these posts, to adjust the height of top support structure 2 at a chosen elevation.

Furthermore, locations such as 27 can be provided at the rear 11 and front 10 end cross beams, having a shape adapted to the accommodation of a fork 28 of a forklift truck 29, used as receiving means 53 for this fork 28 to facilitate the handling of these cross beams by this forklift truck 29.

Other receiving means 53 can be considered as an alternative, such as, for instance, openings, supporting locations under a tube, pockets, sheaths, tunnels, cavities, rings or handles possibly of a hinged, folding or retracting type.

The bottom support structure 3 of the represented pallets 1 is also a substantially flat structure that comprises two outer beams 30 and two inner beams 31. The set of said beams is connected by means of a front end cross-member 32, a rear end cross-member 33 and two intermediate cross-members 34.

Preferably, the underside of these outside beams 30 and/or inside beams 31 can be shaped like a ski to improve the sliding of pallet 1, in particular on the floor of a container. Alternately, or in addition, and for the same reason, the underside of bottom support structure 3 can be provided with sliding parts covering, for instance, these beams and/or with rolls or rollers 48a, arranged preferably under the rear end cross member 33 and/or the front end cross member 32 and directly integrated into these cross-members (see FIG. 16) or mounted, for example, on deployable stands (see FIGS. 27, 28).

The bottom support structure 3 comprises a bottom wheel support assembly 35. As already indicated, said assembly 35 can take different forms.

In the examples represented in FIGS. 1 to 16, it is two rolling strips 35a longitudinally extending from each side of the bottom support structure 3, between an outer beam 30 and the corresponding inner beam 31.

Said rolling strips 35a serve as wheel supports for the right or left wheels 14 of the motor vehicle 4 loaded onto the bottom support structure 3 and form part of a lower rolling path 35b, facilitating the loading of vehicles 4.

The rolling strips 35a can include lowered areas 36, preferably provided with decking, forming receiving and chocking recesses for the wheels 14 of motor vehicle 4.

Figure 17:
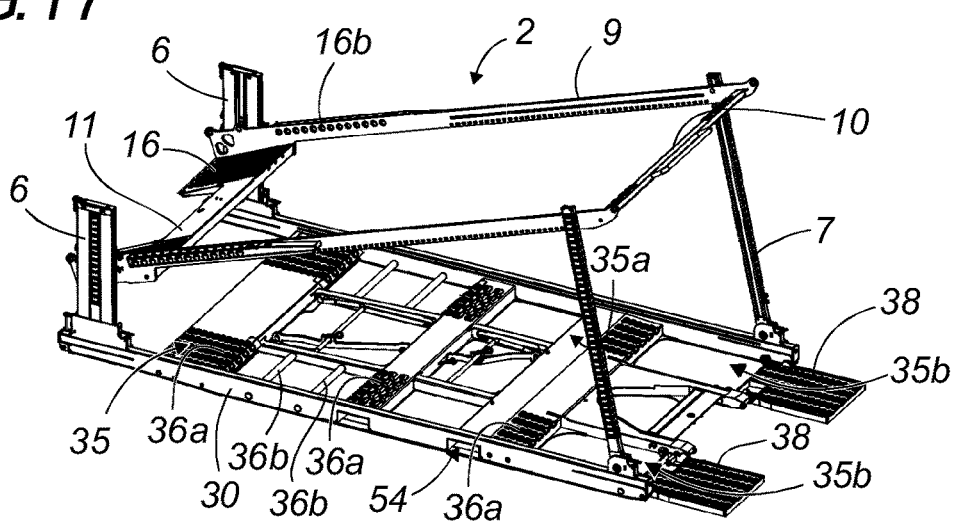
FIG. 17 is a perspective view of a fourth example of the pallet from above, completely unfolded.
Figure 18:
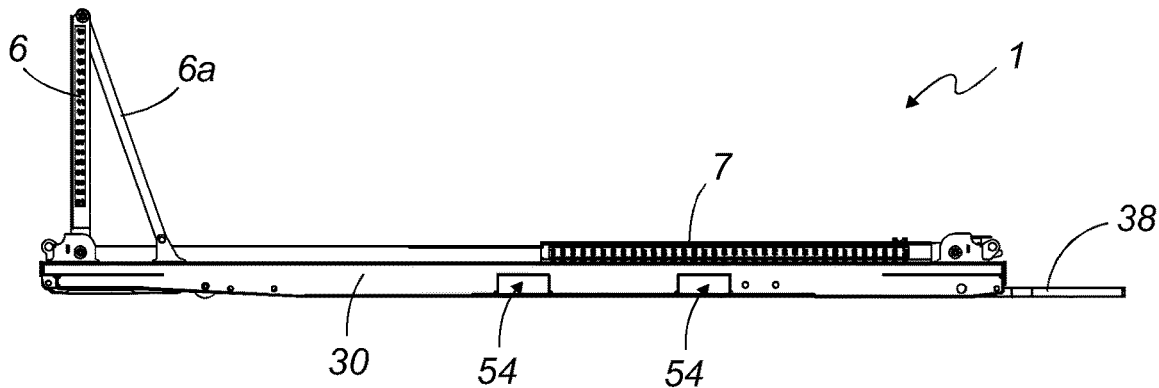
FIG. 18 is a side view of a fifth example of the pallet in the partially unfolded configuration.

In place of said continuous rolling strips 35a, the bottom wheel support assembly 35 can also be formed from several distinct and discontinuous areas of decking 36a, located for example only at the cross-members 33 and 34 as in the example of FIG. 17.

In this case, the rolling path 35b is not continuous and the vehicle 4, during the loading thereof, has to roll, alternately, over the areas of decking 36a and on the ground.

In this example, rods 36b have been added between the outer beams 30 and the inner beams 31 within an area that does not have decking 36, in order to stiffen the assembly. Said rods 36b can also serve as wheel supports and delimit therebetween a receiving niche for the wheels 14 of a vehicle.

As for the top support structure 2, the bottom wheel support assembly 35 is preferably equipped with wheel chocks 37 or fixing straps, removable or integrated, and suitable for the fixing of the wheels 14 of the transported vehicle 4.

Advantageously, the bottom support structure 3 may also comprise extensions 38, detachable, collapsible or folding, which, in the deployed position constitute, as shown in FIG. 3, 11, 15 or 17, an extension to the bottom wheel support assembly 35 of the bottom support structure 3. Such extensions 38 make it easy to adapt to the different sizes of vehicles 4, in making it possible to extend, if necessary, the bottom support structure 3 in order to transport longer vehicles.

Advantageously, said extensions 38 also make it possible to shift the transported vehicle towards the front on the bottom support structure 3, in order to lower more the top support structure 2. The loaded pallet 1 thus adopts a longer and lower configuration, which is fully adapted to transportation by means of a container, as represented in FIG. 19.

Figure 19:
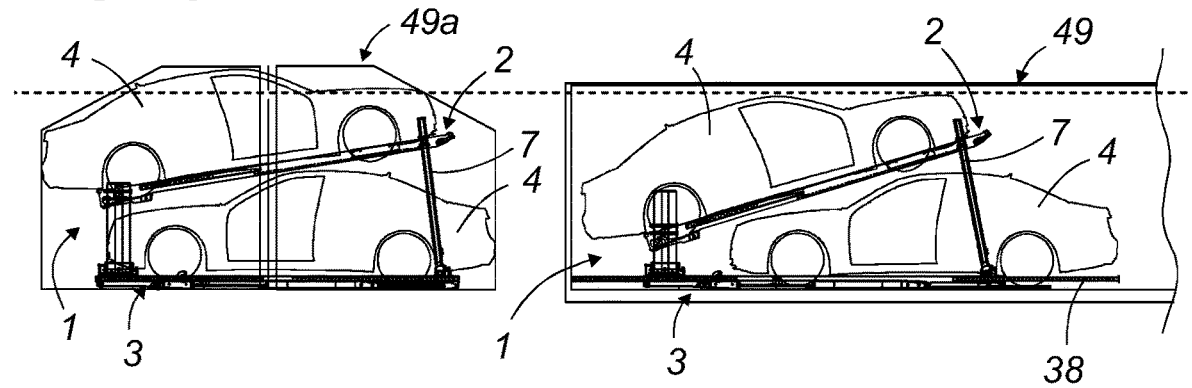
FIG. 19 is a schematic view illustrating loading onto an airplane pallet or into a standard container with the same pallet, configured in different way.

By comparison, the size that must be respected for transportation on an airplane pallet is higher and shorter, as also represented in FIG. 19. In order to adjust thereto, it is then sufficient not to use the extensions 38, which are folded or removed, and to load the lower vehicle by engaging it more towards the rear of the bottom support structure 3. To accomplish this, the top support structure 2 should be raised more. The loaded pallet 1 then adopts a higher and shorter configuration which is adapted to air freight transportation.

At the corners, the bottom support structure 3 has two rear receiving housings 39 and two front receiving housings 40 in which are inserted and attached respectively the lower ends 41 of the main posts 6 and the lower ends 42 of the secondary posts 7.

The rear receiving housings 39 are preferably made in the form of cradles opened on the upper and inner faces in which the lower ends 41 of the main posts 6 are retained so as to be fixed and not hinged, for instance by means of a pin 43 passing through holes 44 in the rear receiving housing 39.

The main posts 6 can be mounted in these rear receiving housings 39, alternately in several different positions: in the transversal prone position illustrated in FIG. 5 and corresponding to the collapsed configuration of pallet 1, or in the vertically erected position illustrated in FIGS. 6 and 7 and corresponding to the partially and fully deployed configurations of pallet 1. To move from one position to the other, pin 43 must be removed then put back in various holes 44 of rear receiving housing 39, after the main post 6 concerned has been tilted.

To facilitate the loading of a vehicle onto top support structure 2 of pallet 1 in the partially deployed configuration, these main posts 6 can also be moved to the slightly inclined erected position, leaning slightly laterally outwards from the pallet.

To do this, the pins 43 are left in the topmost holes 44 of the rear receiving housing 39 and the main posts 6 are simply swung upwards by hinging about these pins 43. Since their lower ends 41 are only partly engaged in the rear receiving housing 39, the pivoting of the main posts 6 can continue beyond the vertical position, as far as an erected position leaning laterally towards the outside of the pallet, in which the main posts 6 bear against the upper edge of the outer wall of the rear receiving housing 39.

This means that the open passage for loading the motor vehicle 4 is thus wider, making it easier to load larger vehicles and, for instance, without needing to fold back their wing mirrors.

To clear the complete width for loading motor vehicle 4 on top support structure 2, the main posts 6 can alternately be fully removed from pallet 1 after the removal of pins 43.

In this case, the top support structure 2 remains advantageously centered laterally because of the insertion of its longitudinal beams 9 between the outside beams 30 of bottom support structure 3, and longitudinally by the engaging of rods 21 in notches provided for them in the inner wall of rear receiving housing 39. This makes it easy to put the main posts 6 back in place after loading the motor vehicle 4.

In both cases (main posts inclined or entirely removed), as soon as the vehicle has been loaded, the main posts 6 are placed in a substantially vertical erected position, inserted up to the bottom of rear receiving housings 39 and locked by pins 43 placed in the bottom-most holes 44 of the rear receiving housing 39. The front receiving housings 40 are preferably open on the upper and rear faces in order to receive the lower ends 42 of secondary posts 7 attached to hinge on them, to be able to swing them from a longitudinally prone position on the outside beams 30, shown in FIGS. 1 and 2 and corresponding to the collapsed and partially deployed configurations of pallet 1, to an erected position inclined to the rear, illustrated in FIG. 8 and corresponding to the fully deployed configuration of pallet 1.

In the same way as previously, receiving means 53 for the fork 28 of a forklift truck 29 are preferably provided at the level of the outside beams 30 or the front end cross members 32 and/or rear end cross members 33 to facilitate the handling of pallet 1.

These receiving means 53 can assume different shapes, in particular openings, pockets, tunnels or cavities arranged in these beams or cross beams.

For instance, locations 27 are provided on the rear 33 and front 32 end cross members.

In the first example of pallet 1 shown in FIGS. 1 to 10 and 15 to 18, transverse pockets 54 are provided in the outside beams 30 to accommodate the fork 28 of a forklift truck 29 placed crosswise with respect to pallet 1.

Preferably, these pockets 54 are made at the level of the intermediate cross members 34 which are advantageously hollow in order to form a receiving tunnel for the fork 28.

In addition to these pockets 54, hinged and folding or retracting handles 45 can also be provided under the outside beams 30. These handles 45 deploy downwards enabling forklift truck 29 to manipulate the pallet 1 when the location of the loaded pallet center of gravity does not allow the use of pockets 54.

Advantageously, these handles 45 can be deployed automatically by gravity when the pallet 1 is lifted, as will be described below. In addition, these handles 45 are preferably substantially trapezoidal in shape and are inclined at an oblique angle in the deployed condition, improving their automatic folding away under bottom support structure 3 when pallet 1 is loaded into a transport container.

Figure 12:
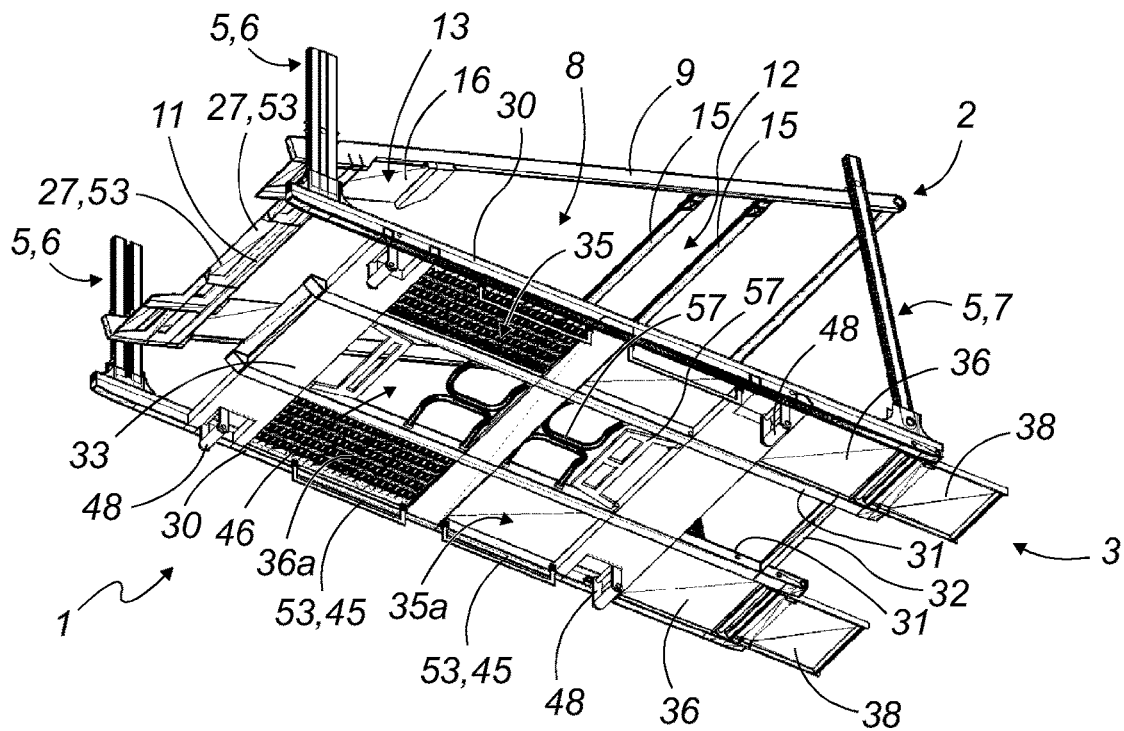
Figure 13:
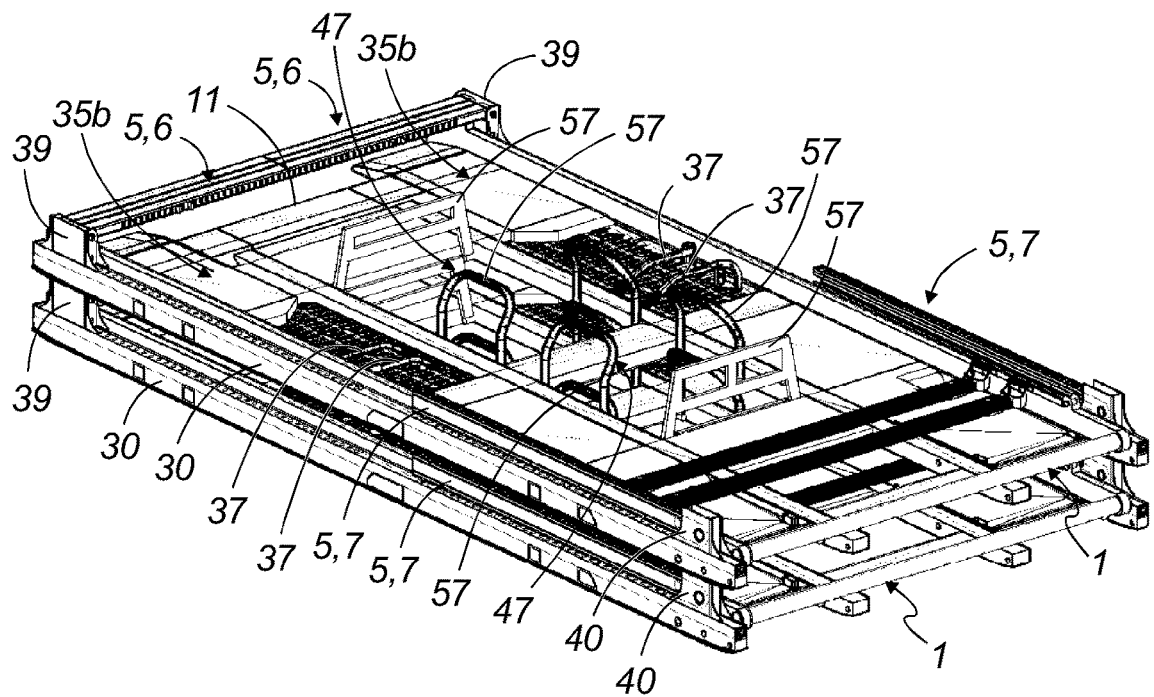
FIG. 13 is a view of two stacked pallets according to FIG. 11 in the folded configuration.

In the second variant of pallet 1 shown in FIGS. 11 to 13, different receiving means 53 are provided.

In this embodiment, there is no pocket included in the longitudinal or cross beams in order not to render them fragile, or make it necessary to increase their thickness. The receiving means 53 consist solely of rings or handles 45, hinged, folding or retracted, and deployable under the bottom support structure 3.

Another type of hinged and folding or retracting handle 57 may also be provided at the level of inside beams 31 and/or intermediate cross members 34 and rear end cross member 33 to facilitate handling of the pallet 1 in the collapsed configuration by a forklift truck 29.

As shown, when they are folded away, these handles 57 do not protrude from bottom support structure 3 and extend on the flat in the empty central space 46 located between the inside beams 31. However, when they are raised, they are brought to protrude above bottom support structure 3 and above the whole pallet 1 in the collapsed condition, and can easily be engaged by the fork 28 of a forklift truck 29.

If they are fitted onto both cross members 33, 34 and inside beams 31, the forklift truck 29 can advantageously pick up pallet 1 transversally or longitudinally as needed.

As shown more particularly in FIG. 13, handles 57 of inside beams 31 are preferably arranged to face each other in the empty central space 46 and preferably converge towards each other at their upper section 47.

When the pallets 1 are stacked on each other, thanks to their converging upper section 47, these handles 57 can advantageously fulfil a function of automatically centering the identical pallet 1 stacked on top. The stacking operation can therefore be carried out easily by a single operator at the controls of a forklift truck 29, without any need for an additional operator on the ground.

Figure 9:
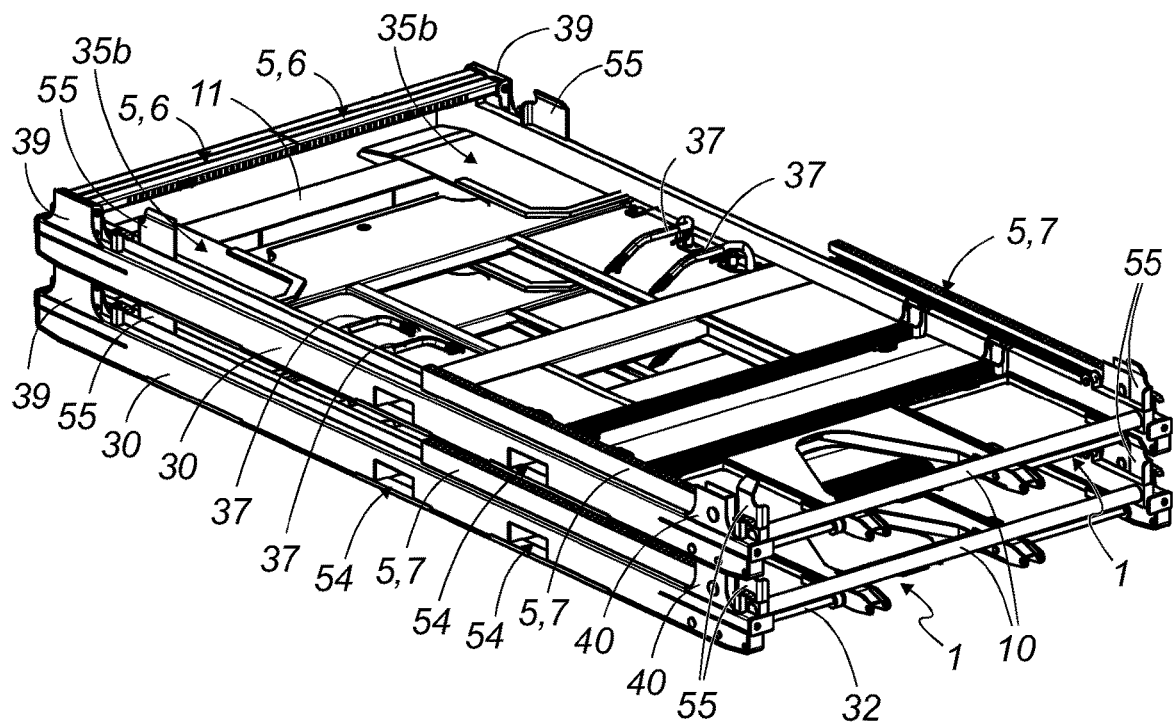
FIGS. 9 and 10 are, respectively, a view from above in perspective and a rear flat view, showing how two pallets according to FIG. 1 are stacked on top of each other in the folded configuration.
Figure 10:
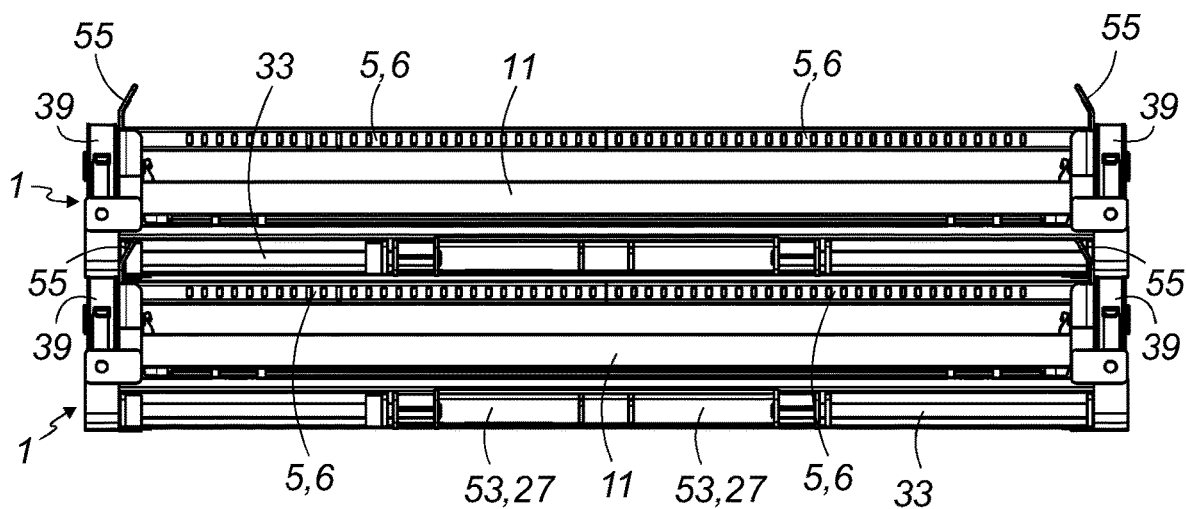

For the first variant of pallet 1 shown in FIGS. 1 to 10, this automatic centering function is fulfilled by other protruding centering devices: protrusions 55, located near the corners of top support structure 2, and which extend protruding upwards from the longitudinal beams 9. As can be seen in FIGS. 9 and 10, these protrusions 55 act as a guide when the pallets 1 are stacked on each other.

As shown in the second variant, the pallet 1 may also include, on the underside, stands, or preferably roller feet 48, folding or retractable, and deployable under the bottom support structure 3.

When they are deployed, these roller feet or stands raise the pallet 1 above the ground to a height advantageously designed to bring the underside of the bottom support structure 3, and especially its longitudinal beams 30 and 31, up to the level of the floor of container 49 or of airplane pallet 49a to facilitate the engaging of the pallet 1 thereon.

They also allow the extension of the folding or retracting handles 45 which deploy downwards beneath the bottom support structure 3 if they are provided on pallet 1. Pallet 1 can then be handled by a forklift truck 29 placed transversely with respect to the pallet, for instance to be moved laterally.

When the arrangement consists of roller feet 48, pallet 1 can be moved much more easily by forklift truck 29 which needs only to push pallet 1 longitudinally for rolling the rollers of roller feet 48.

When they are folded away or retracted, these roller feet 48 or stands do not form an extra thickness on the underside of bottom support structure 3, or form a very slight extra thickness that does not obstruct the stacking of the collapsed pallets.

When the arrangement consists of roller feet 48, they can be designed advantageously so that their roller remains in contact with the floor and is capable of turning even in the folded or retracted position. By turning in this way, they help move the pallet 1 by sliding on the floor, for instance when loaded into a container 49 or onto an airplane pallet 49a.

Pallet 1 can also include one or several other helpful means, such as for instance, one or several longitudinal abutment members 50 or one or several lateral abutment members, ensuring a certain gap between the loaded pallet and the walls of container 49 or between two adjacent pallets to prevent the transported motor vehicles 4, the ends of which generally extend beyond support structures 2, 3, from bumping against the walls and protecting them from any risks of damage.

These longitudinal or lateral abutment members 50 are preferentially folding or retracting devices in order not to increase the size of pallet 1 in the collapsed condition, and which are for instance telescopic and/or of an adjustable length in the deployed position to adjust to various gauges of the motor vehicles 4 being transported, or to the sizes of container 49. The longitudinal abutment members 50 shown are, for instance, retractable into the outside beams 30 of bottom support structure 3.

Preferably, the pallet 1 also comprises one or more anchoring elements 51, such as, for example, a means for passing or anchoring a lashing means, such as a cable 52, a rope or a strap for fastening the pallet 1 to the container 49 or to the pallet 49a, in order to fully immobilize the loaded pallet 1 within the container 49 or the pallet for transportation.

These passage or anchoring means 51 are preferably located on main posts 6 and secondary posts 7, and are for instance, through holes which can be more particularly the receiving holes 26, also used for adjusting the height of top support structure 2. They can also be located on top support structure 2, for instance on sliding members 19 and 20.

Figure 37:
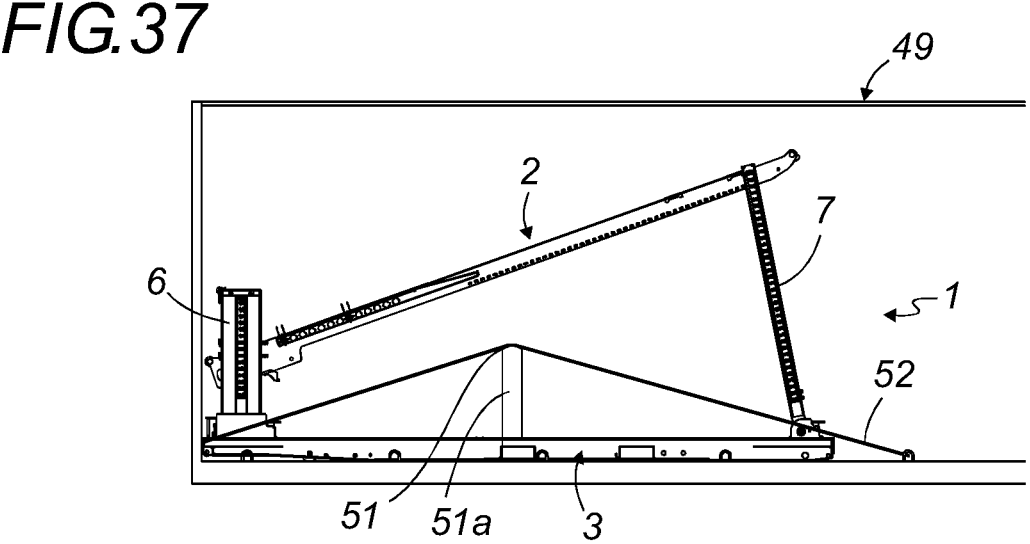
FIG. 37 is a side view of a sixth example of the pallet, stowed within a container by means of an additional intermediate post.

Said anchoring elements 51 can also be located at one or more additional intermediate posts 51a as represented in FIG. 37.

These additional intermediate posts 51a can also directly serve as anchoring elements, if the length thereof is adjustable, for example if they are telescopic, by coming into abutment against the ceiling of the container 49.

The pallet 1 is designed to pass from a folded configuration shown in FIGS. 1, 9, 13 and 14 to a fully deployed configuration shown in FIGS. 3, 11, 15 and 17.

In the folded configuration, the top support structure 2 is in the low position. It is found to be fitted into the bottom support structure 3.

In the embodiments represented in FIGS. 1 to 17, the main posts 6 extend over the top support structure 2, in the transversal lying position with respect to the general direction of the pallet 1. The secondary posts 7 extend towards the rear in the longitudinal lying position with respect to the general direction of the pallet 1, over the top of the outer beams 30 of the bottom support structure 3.

Other variants may however be envisaged without departing from the contemplated embodiments. Thus, in the variant of FIG. 18, the main posts 6 longitudinally extend when they are in the lying position. So as not to interfere they must therefore be made thinner than in the previous variants. For this reason, a lateral counterpart 6a must be added to each main post 6 in order to reinforce it when it is found in the erected position.

The support structures, top 2 and bottom 3, are designed to nest one within the other in the folded configuration of the pallet 1. Thus, the longitudinal beams 9 of the top support structure 2 advantageously engage within the outer beams 30 of the bottom support structure 3 in order to represent an extremely limited additional thickness with respect thereto, as can be seen for example in FIG. 21. This limited additional thickness, as well as that resulting from the secondary posts 7 (and possibly the main posts 6) in the lying position, do not interfere with the opening of the side doors of a vehicle 4 loaded onto the top support structure 2.

Figure 20:
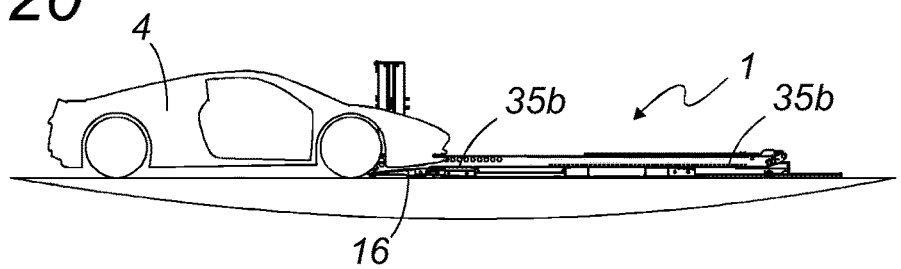
FIG. 20 is a schematic view illustrating the easy access of a vehicle to the top support structure.
Figure 21:
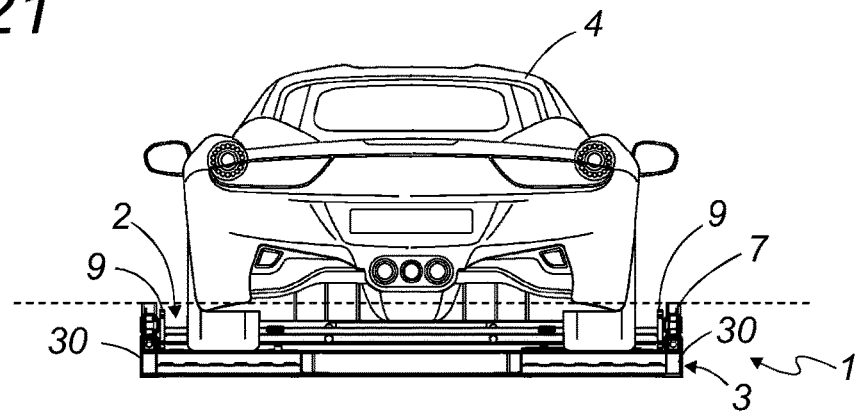
FIG. 21 is a schematic view illustrating the low overall height of two nested support structures that do not interfere with the opening of side doors.

Furthermore, as illustrated, for example in FIG. 20, the front 12 and rear 13 top wheel support devices of the top support structure 2 are placed in alignment with the rolling strips 35a or areas of decking 36a of the bottom support structure 3, or just above them.

Together they form the rolling path 35b, continuous or discontinuous, which allows easy driving of the motor vehicle 4 to be loaded.

In the folded position, the pallets 1 are substantially flat and can be stacked accurately on one another as illustrated in FIGS. 9, 10 and 13; this stacking can be facilitated advantageously by the use of any centering means, for instance protrusions 55 or handles 47 deployable upwards into the empty central space 46 of pallet 1, permitting handling in both directions by forklift truck 29 and ensuring centering, as explained previously.

To limit the weight, size and cost of the pallet 1, it is not motorized and all the movements needed for deployment, or for the various loading and unloading or folding phases of this pallet, are obtained by means of a forklift truck 29.

For a fuller description of the embodiments, the various steps of a deployment process and the loading of motor vehicles on pallet 1 according to embodiments of FIG. 1 and FIG. 11, then the positioning of this loaded pallet 1 inside a transport container 49, are succinctly described here with reference to FIGS. 22 to 36.

A folded pallet 1, as shown in FIG. 1 or 13, is first placed on the ground.

Figure 2:
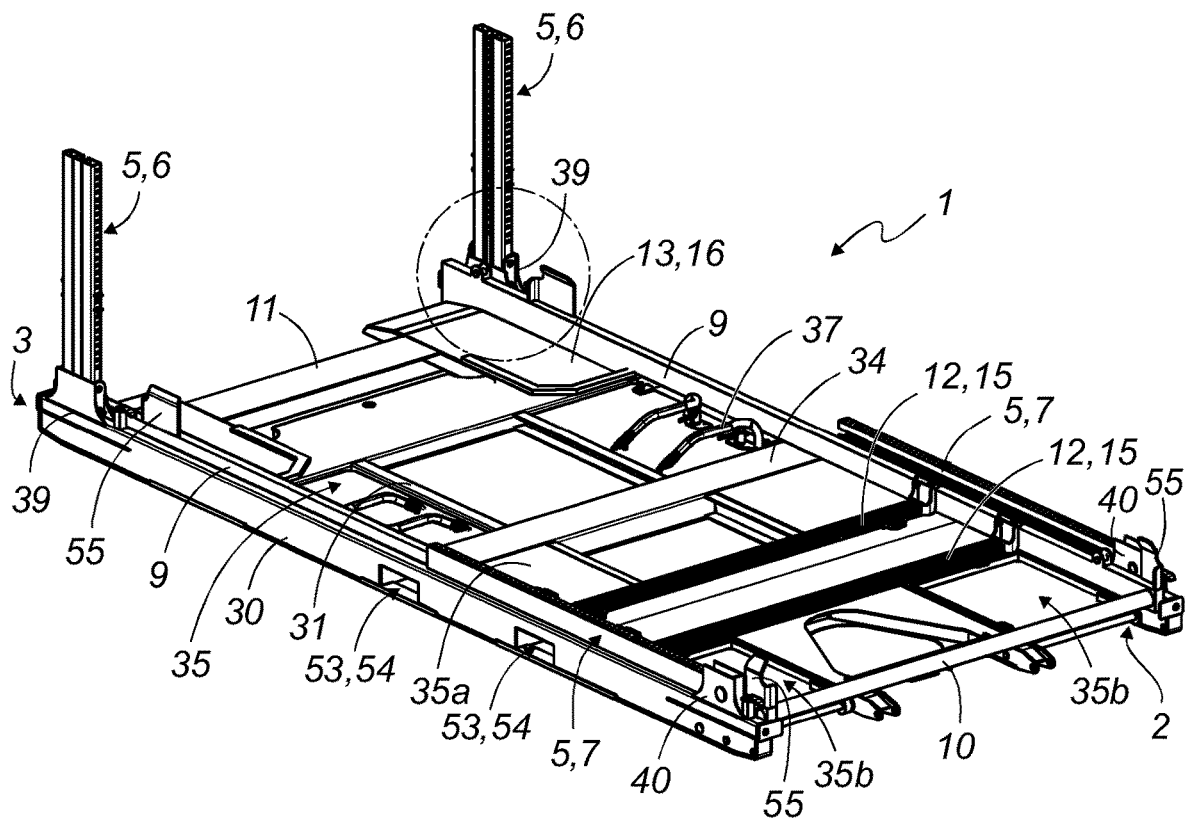

The two main posts 6 are then put in a substantially vertical erected position as shown in FIG. 2. To do this, pins 43 are removed from upper holes 44 in the rear receiving housing 39. The main posts 6 are swung upwards and their lower end 41 is inserted deeper in the corresponding rear receiving housing 39. The two main posts 6 are then locked with pins 43, this time engaged in the lower holes 44 of the rear receiving housing 39.

This brings the main posts 6 to bear against the outer face of the rear receiving housings 39 so that the pins 43 take up all the longitudinal forces.

Figure 22:
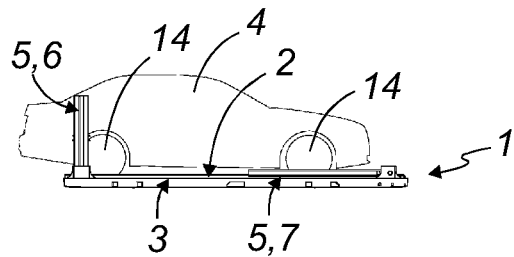
FIGS. 22 to 30 are schematic profile views that illustrate the different successive steps of a loading sequence of two motor vehicles onto the pallet of FIG. 11, then of the engagement of said pallet within a transport container.

A vehicle 4 can then be loaded onto the top support structure 2, as shown in FIG. 22, by rolling it over the rolling path 35b.

As explained previously, main posts 6 can also be removed entirely or put in an erected position inclined laterally outwards, to facilitate the loading of this motor vehicle 4. When loading is complete, the main posts 6 are brought to a substantially vertical erected position as shown and are locked in that position.

The vehicle 4 is stopped when its wheels 14 are correctly arranged on the front 12 and rear 13 top wheel support devices of the top support structure 2 and are immobilized, for example, by means of suitable straps.

If only one motor vehicle 4 must be loaded onto pallet 1, the loading process is then complete and all that remains is to put pallet 1 inside container 49 as explained below.

Figure 23:
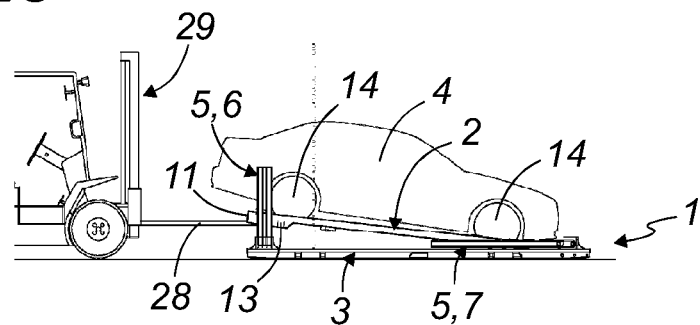

If two motor vehicles 4 must be loaded on pallet 1, a forklift truck 29 raises, as shown in FIG. 23, rear end cross member 11 of top support structure 2 by means of its fork 28 engaged in the locations 27. During the lifting movement, cylindrical rods 21 used as rear sliding members 20 slide in groove 22 in main posts 6.

When the height chosen for the rear of the top support structure 2 is reached, the rear end cross member 11 is locked in the high position by two pins 25 on either side, inserted into the receiving holes 26 of the main posts 6, located just below and just above the corresponding cylindrical rod 21, locking it in both directions, upwards and downwards.

Figure 24:
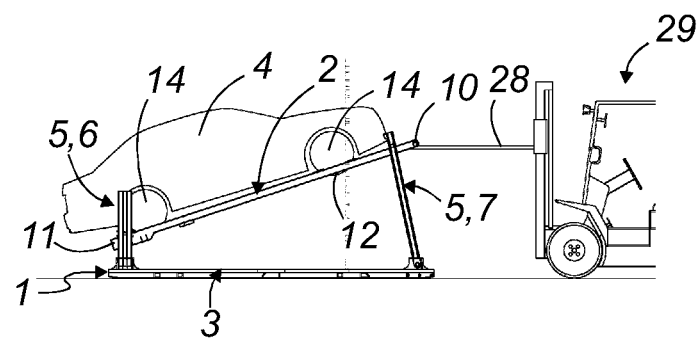

The forklift truck 28 is then driven around the pallet to raise the front end cross member 10 of top support structure 2, as shown in FIG. 24, until the height chosen for the front of the top support structure 2 is reached.

Lifting the front end cross member 10 in this way automatically pulls up the hinged secondary posts 7, swiveling by the sliding effect of cylindrical rods 21 in the groove 22, moving from a longitudinal lying position to an erected position, inclined towards the rear.

In the same way as previously, the front end cross member 10 is then locked in the high position, in both directions, by two pins 25 inserted into receiving holes 26 of secondary posts 7, located just below and just above the cylindrical rods 21.

Figure 25:
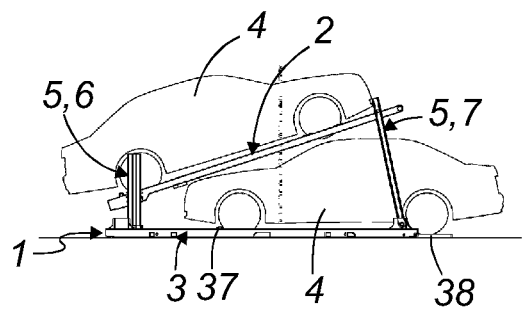

The second motor vehicle 4 is then loaded onto the bottom support structure 3 of pallet 1 as shown in FIG. 25. If necessary, extensions 38 are extended first, to lengthen the bottom wheel support assembly 35. Then, motor vehicle 4 is engaged on bottom support structure 3 by running it along the rolling path 35b in the opposite direction to the first motor vehicle 4.

When the wheels 14 of this second motor vehicle 4 are correctly positioned on the bottom wheel support assembly, they are immobilized by means of wheel chocks 37 or suitable straps.

Figure 26:
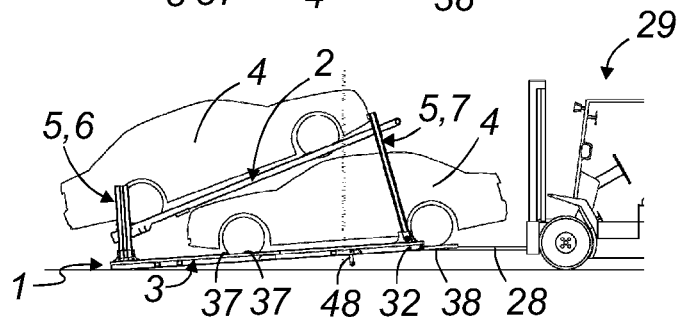
Figure 27:
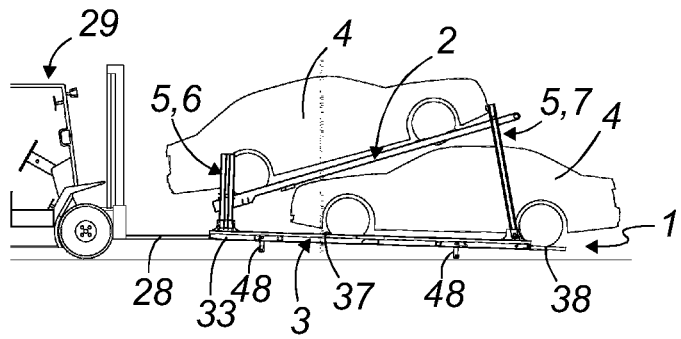
Figure 28:
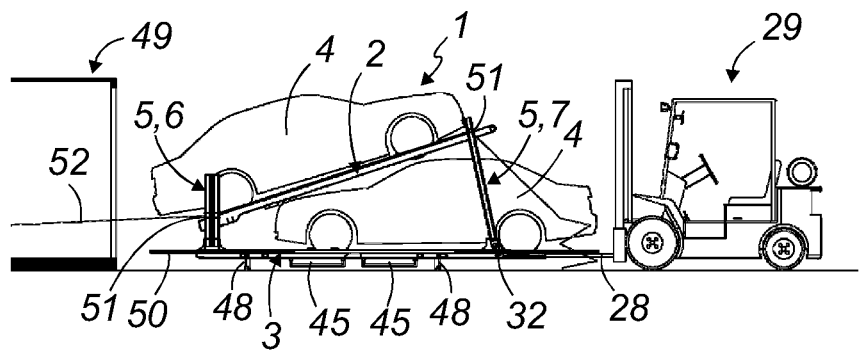

As shown in FIGS. 26 and 27, one side and then the other of the loaded pallet 1 is then slightly lifted, by raising the front end cross member 32 and rear end cross member 33 of the bottom support structure 3 with forklift truck 29, to deploy on the underside the stands or roller feet 48 when pallet 1 is provided with them, as in the case of some embodiments of pallet 1 described in this application.

Figure 31:
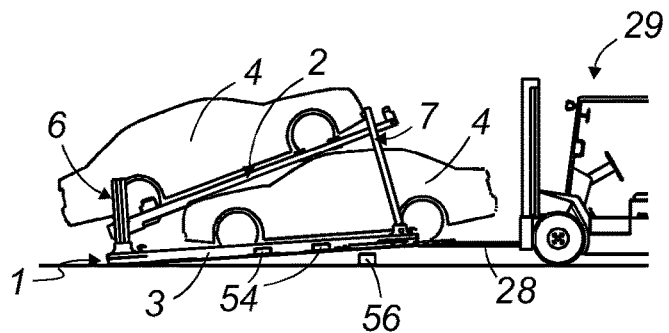
FIGS. 31 to 36 are schematic profile views illustrating the steps of an engagement sequence within a transport container of a pallet according to FIG. 1 which is loaded with two motor vehicles.
Figure 32:
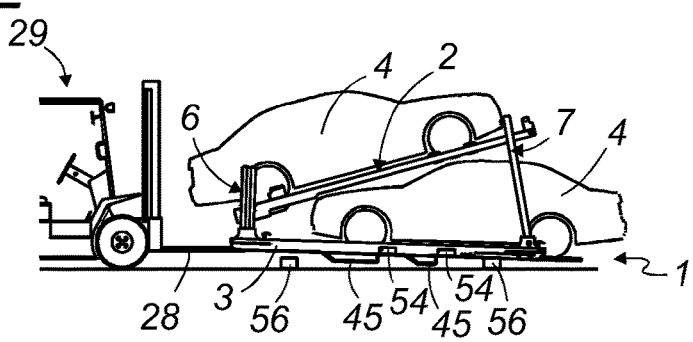

Otherwise, a wooden beam 56 is slipped under the two ends of the loaded pallet as shown in FIGS. 31 and 32. In this case, the handles 45 under the outside beams 30 of the bottom support structure 3 extend downwards automatically under the effect of gravity. In the same way as the stands or roller feet 48, these beams 56 align the lower level of pallet 1 with the height of container floor 49.

Figure 33:
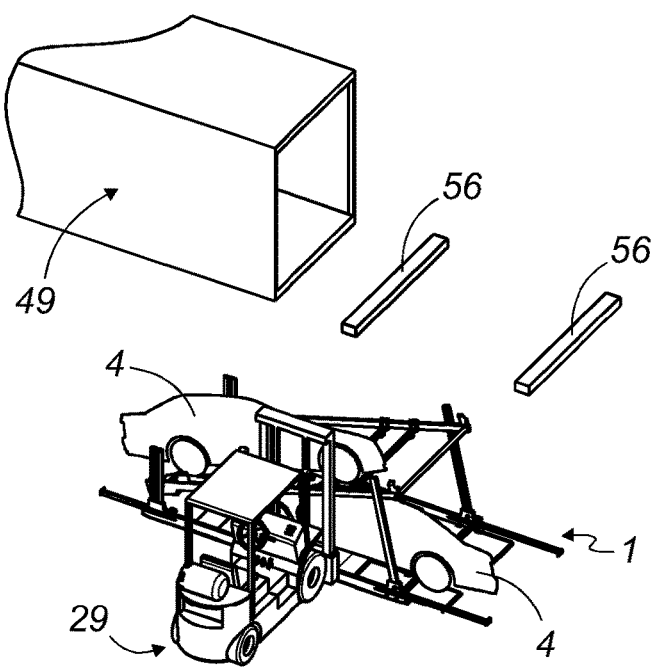
Figure 34:
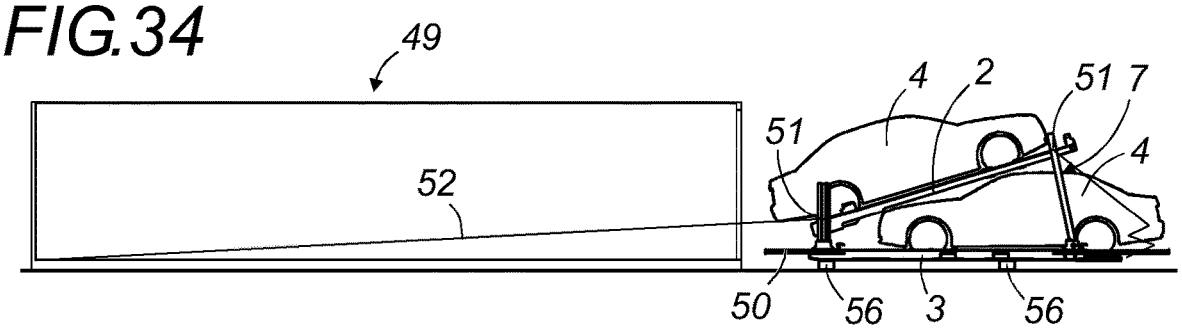

If loaded pallet 1 is not placed correctly facing the access opening of container 49, as shown in FIG. 33, the forklift truck 29 can then move to be transversally placed with respect to pallet 1, moving it sideward by engaging in its fork 28 in the pockets 54 or the handles 45 if the center of gravity is not situated between these pockets 54.

Once the pallet 1 is correctly positioned facing the opening of container 49, its handles 45 are folded away if necessary and an anchoring means, such as cables 52, straps or lines, is inserted, with one end previously attached to the bottom of container 49, in the passage or fastening means for an anchoring means 51 on, for example, the main posts 6 and secondary posts 7. These anchoring cables 52, straps or lines, then come to bear by sliding on pallet 1.

At any time after the loading of the motor vehicle or vehicles 4 onto the pallet 1, but prior to the engaging of the pallet 1 in container 49, the longitudinal abutments 50 and any lateral abutments that may be fitted to the pallet are deployed. The length of these longitudinal abutments 50 is adjusted to extend beyond the overhanging ends of the motor vehicle or vehicles 4 loaded on the pallet.

Figure 29:
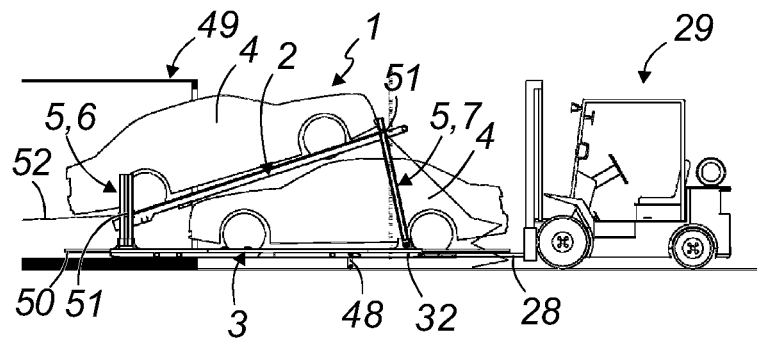
Figure 35:
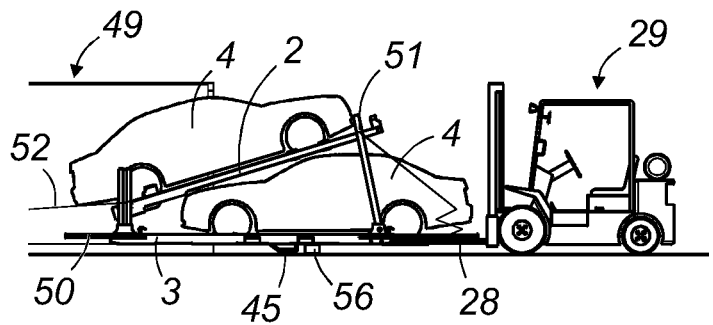

The forklift truck 29 then move to be placed at the front of the pallet 1 and pushes it into container 49 as shown in FIG. 29 or 35. This movement is very easy because the loaded pallet 1 slides on the beams 56 then on the rollers 48a or longitudinal beams 30, 31, with the underside preferably ski-shaped, or rolls on roller feet 48, taking up at least part of its weight.

When the pallet is partially engaged in container 49, if necessary, the first roller feet 48 (at the rear) then the second roller feet 48 (at the front) are successively folded away gradually as pallet 1 is engaged.

If the handles 45, as previously described, have a gradual trapezoidal shape and a suitable oblique inclination, they fold away automatically under the pallet when it is engaged in container 49. This avoids risks of damage in the event of the operator forgetting to fold them away.

The forklift truck 29 continues to push the loaded pallet 1 up to the back of container 49. Advantageously, when pallet 1 has rollers 48a or roller feet 48, the rollers contribute to the sliding of the loaded pallet 1 up to its transport position inside container 49. Otherwise, sliding means, rollers or skis on beams 30, 31 may facilitate the translation movement over the floor of container 49.

Figure 36:
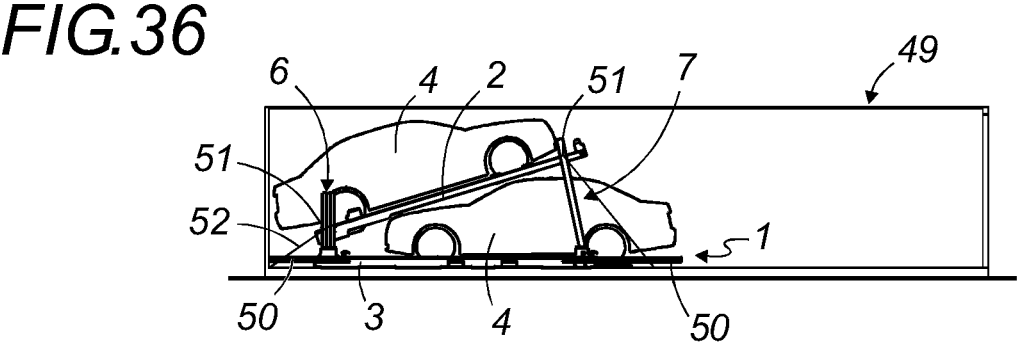

During the entire involved movement for engaging and translating the pallet 1 inside container 49, anchoring cables 52 are held under slight tension, for instance by an operator. When pallet 1 is in the transport position, with the abutments 50 bearing against the back of the container, forklift truck 29 is withdrawn. The attaching cables 52 or straps are tensioned and attached to the floor, for instance using rings provided for the purpose in the floor of container 49 to tie down loaded pallet 1 for transport, as shown in FIG. 36.

Figure 30:
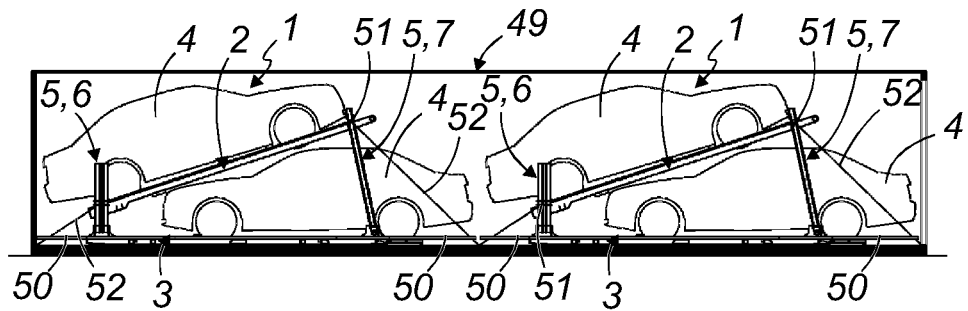

For a 12 meter (40 foot) container 49, a second identical pallet 1 can be loaded with one or two motor vehicles 4 then inserted in turn and anchored in container 49 as shown in FIG. 30. This second loaded pallet can also be replaced by a stack of empty pallets 1 in the folded configuration.

Container 49 is then closed and is ready to leave. Using pallet 1, the interior space of the container is totally optimized and it can carry up to four motor vehicles 4 without fearing any damage.

The longitudinally abutments 50 of the two pallets press against the back wall and the door of container 49 for those at the ends of the two pallets 1, and contact each other for those situated between the two pallets 1. This immobilizes totally the two pallets 1 in the longitudinal direction. They are also immobilized in the lateral direction by means of side abutments, or more simply by their own width which is barely less than that of container 49. Once they are anchored, cables 52 prevent the upward movement of pallets 1. The transported pallets 1 are thus totally immobilized in every direction, as shown in FIG. 30.

If beams 56 are used, they can be stowed away and transported inside container 49. Advantageously, they can be held against the door by longitudinal abutments 50 and tied down, for instance, using straps.

There is no need to describe the reverse unloading and collapsing operation for pallet 1 which the man of the art can easily work out from the above explanations.

However, to make it easier to remove the pallets 1 from container 49, one or several holes 58, or any other attaching means, may be included advantageously in the front end cross member 32 of the pallet as a way of attaching any pulling means needed to extract the pallet from container 49.

The loading of a pallet 1 for the placing thereof on an airplane pallet 49a is performed in the same way, the pallet simply being adjusted in such a way as to respect the imposed air freight gauge. The extensions therefore remain folded.

Figure 38:
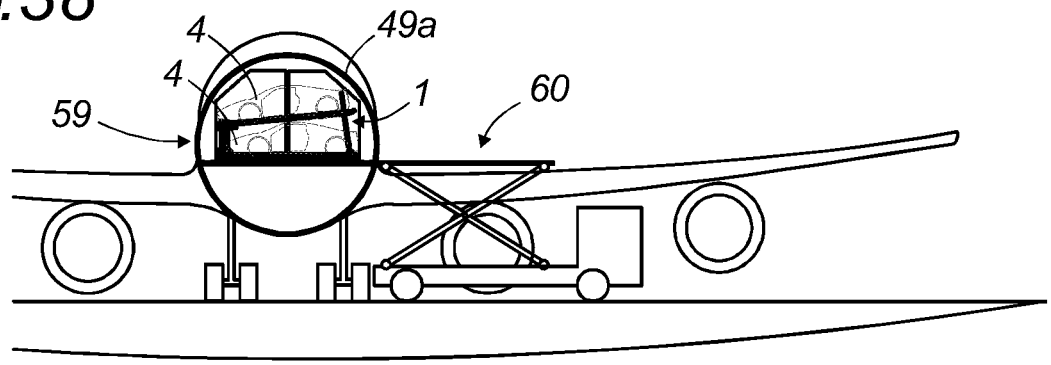
FIG. 38 is a schematic view illustrating the loading of a pallet within a cargo plane.

Once the pallet 1 is loaded onto the air transport pallet 49a, the latter is loaded into the cargo hold of a cargo plane 59 by means of a dedicated lifting vehicle 60 as represented in FIG. 38.

Obviously, the contemplated embodiments are not confined to the preferential embodiments described previously and shown in the various figures, the man skilled in the art being able to make many modifications and imagine other variants without moving out of the scope or framework recited by the claims.

The invention claimed is:

1. A pallet being deployable, non-motorized, designed for loading one or two motor vehicles for their transport within a container or an airplane pallet, the pallet comprising:
   a bottom support structure and a top support structure, each capable of supporting a motor vehicle, the top support structure being provided in order to alternately move from a lower position to an upper position wherein the top support structure is maintained, raised above the bottom support structure;
   two main posts and two secondary posts, which are attached at lower ends thereof, respectively, at the rear, for the main posts, and at the front, for the secondary posts, of the bottom support structure, which posts are locatable in a lying position or an erected position, and which carry the top support structure in the upper position;
   front sliding members and rear sliding members, allowing for the sliding of the top support structure along the main posts and secondary posts in order to pass from a lower position thereof to an upper position thereof and vice versa;
   wherein:
   the top support structure is a framework structure that is substantially flat and that delimits a completely free central space and that comprises a top front wheel support device and a top rear wheel support device, that are discontinuous one from the other and intended to receive the wheels of a motor vehicle in a transportation position upon the top support structure;
   the bottom support structure is a substantially flat structure comprising a bottom wheel support assembly intended to receive the wheels of a motor vehicle in a transportation position upon the bottom support structure; and
   in a lower position, the top support structure is nested within the bottom support structure, the top front wheel support device and the top rear wheel support device being inserted onto or in alignment with the bottom wheel support assembly of the bottom support structure and thus forming, together with said bottom wheel support assembly, all or part of a lower rolling path which allows for the loading onto the top support structure of a motor vehicle up to a transportation position, via the own movement of the motor vehicle and without an access ramp.

2. A pallet according to claim 1, wherein the bottom support structure is a partially open frame comprising, besides the bottom wheel support assembly:
   two outer longitudinal members and two inner longitudinal members; and
   a set of cross-members wherein at least one front end cross-member and one rear end cross-member join said outer longitudinal members and said inner longitudinal members.

3. A pallet according to claim 1, further comprising retaining means that block the front sliding members and the rear sliding members, when the upper position of the top support structure is reached, these retaining means being capable of blocking the front sliding members and the rear sliding members, at different heights along the main posts and the secondary posts respectively, in order to adjust an altitude of the upper position of the top support structure.

4. A pallet according to claim 1, wherein, in the lying position, the main posts extend transversely with respect to a general direction of the pallet.

5. A pallet according to claim 1, wherein, in the erected position, the main posts are inclined laterally outward or else are substantially vertical.

6. A pallet according to claim 1, wherein the secondary posts are articulately secured by a lower end thereof to the front of the bottom support structure, and can pass by pivoting from the lying position to the erected position.

7. A pallet according to claim 1, wherein in the erected position, the secondary posts are inclined towards the rear of the pallet.

8. A pallet according to claim 6, wherein the secondary posts are attached to the top support structure in such a way as to automatically erect when the front of the top support structure is raised, an inclination of the secondary posts in the erected position depending upon the height to which the front of the top support structure is raised.

9. A pallet according to claim 1, wherein the bottom wheel support assembly is a set of four individual structures each intended to receive one of the wheels of the transported motor vehicle, or a set of two transverse structures intended to receive for one two front wheels and for the other two rear wheels of the transported motor vehicle, or a set of two longitudinal structures intended to receive for one two left wheels and for the other two right wheels of the transported motor vehicle.

10. A pallet according to claim 1, wherein said bottom wheel support assembly also comprises removable or folding or retractable extensions, which, in a folded out position, constitute an extension to the lower rolling path.

11. A pallet according to claim 1, wherein the top front wheel support device or the top rear wheel support device is a set of two individual structures each intended to receive one of two front or rear wheels of the transported motor vehicle, or a transverse structure intended to receive two front wheels or two rear wheels of the transported motor vehicle.

12. A pallet according to claim 1, wherein the top front wheel support device or the top rear wheel support device is movable longitudinally with respect to a general direction of the pallet.

13. A pallet according to claim 1, further comprising receiving means capable of co-operating with the forks of a forklift truck, which are located at the front and the rear of the top support structure, and on the sides of the bottom support structure.

14. A pallet according to claim 1, wherein the bottom support structure comprises, on the underside thereof, rolls, rollers, sliding parts, ski-shaped longitudinal members, stands, or deployable roll or roller feet beneath the bottom support structure.

15. A pallet according to claim 1, further comprising at least one longitudinal, abutment member or an anchor member.

16. A pallet according to claim 1, wherein, when the pallet is fully collapsed, the pallet can be stacked upon other identical pallets and further comprising protruding centering elements allowing for the automatic centering of an identical stacked pallet thereabove.

17. A method for loading one or two motor vehicles inside a container or onto an airplane pallet by means of a pallet according to claim 1, the method comprising the following steps:
placing the pallet on the ground, the top support structure being nested into the bottom support structure;
loading a vehicle onto the top support structure in making the vehicle roll over the lower rolling path until the wheels thereof are arranged on the top front wheel support device and the top rear wheel support device of the top support structure;
immobilizing the wheels of said vehicle on the corresponding front and rear top wheel support devices to form a loaded pallet;
pushing the loaded pallet using a forklift truck until the loaded pallet is inside the container or is on the airplane pallet.

18. A method according to claim 17, further comprising the following step:
placing the two main posts in the erected position;
the step of placing the main posts being performed before or after loading the vehicle onto the top support structure.

19. A method according to claim 17, wherein, before the step consisting of pushing the loaded pallet using a forklift truck until the loaded pallet is inside the container or is on the airplane pallet, the method also comprises the following steps:
raising the rear of the top support structure using forks of a forklift truck, by sliding the rear sliding members along the main posts;
locking the rear of the top support structure in the upper position;
raising the front of the top support structure using the forks of a forklift truck, by sliding the front sliding members along the secondary posts thus causing pivoting of said secondary posts such that they automatically erect during the raising of the front of the top support structure and pass from a lying position to an erected position;
locking the front of the top support structure in the upper position;
loading a second vehicle onto the bottom support structure, in making the second vehicle roll over the bottom support structure until the wheels thereof are arranged on the bottom wheel support assembly;
immobilizing the wheels of the second vehicle on the bottom wheel support assembly.

* * * * *